United States Patent
Tada et al.

(10) Patent No.: US 9,259,647 B2
(45) Date of Patent: Feb. 16, 2016

(54) IMAGE GENERATION PROGRAM, RECORDING MEDIUM, INFORMATION PROCESSING METHOD, INFORMATION PROCESSING DEVICE AND INFORMATION PROCESSING PROGRAM FOR A PUZZLE GAME

(75) Inventors: Koji Tada, Tokyo (JP); Wataru Kato, Chiba (JP); Masasuke Yasumoto, Tokyo (JP); Masahiko Sato, Tokyo (JP)

(73) Assignees: SONY CORPORATION, Tokyo (JP); SONY COMPUTER ENTERTAINMENT INC., Tokyo (JP)

( * ) Notice: Subject to any disclaimer, the term of this patent is extended or adjusted under 35 U.S.C. 154(b) by 251 days.

(21) Appl. No.: 13/697,887

(22) PCT Filed: Apr. 21, 2011

(86) PCT No.: PCT/JP2011/059799
§ 371 (c)(1), (2), (4) Date: Nov. 14, 2012

(87) PCT Pub. No.: WO2011/145427
PCT Pub. Date: Nov. 24, 2011

(65) Prior Publication Data
US 2013/0063480 A1    Mar. 14, 2013

(30) Foreign Application Priority Data
May 17, 2010 (JP) .................. 2010-113628

(51) Int. Cl.
  *G06G 5/00*    (2006.01)
  *A63F 13/40*   (2014.01)
(52) U.S. Cl.
  CPC .......... *A63F 13/10* (2013.01); *A63F 2300/308* (2013.01); *A63F 2300/61* (2013.01); *A63F 2300/638* (2013.01)

(58) Field of Classification Search
None
See application file for complete search history.

(56) References Cited

U.S. PATENT DOCUMENTS

| | | | |
|---|---|---|---|
| 2005/0116412 A1* | 6/2005 | Lee | 273/160 |
| 2007/0287517 A1* | 12/2007 | Asuna et al. | 463/7 |
| 2010/0016049 A1 | 1/2010 | Shirakawa et al. | |

FOREIGN PATENT DOCUMENTS

| | | |
|---|---|---|
| EP | 1044706 | 10/2000 |
| JP | 11-000475 | 1/1999 |

(Continued)

OTHER PUBLICATIONS

Miniclip, Stackopolis, Mar. 16, 2008, http://web.archive.org/web/20080316064027/http://www.miniclip.com/games/stackopolis/en/.*

(Continued)

*Primary Examiner* — Stephen R Koziol
*Assistant Examiner* — Diana Hickey
(74) *Attorney, Agent, or Firm* — Katten Muchin Rosenman LLP

(57) ABSTRACT

The image generating program makes the image generating device perform: setting a number of increase or decrease objects in at least one of a plurality of regions on a field having the plurality of regions divided from each other and connected to each other; generating a display image including a display corresponding to the field and the set number of increase or decrease objects; generating the display image in which an increase or decrease number corresponding to a selected level is set in the region within a predetermined area; generating the display image in which the number of increase or decrease objects is increased or decreased on a basis of the set increase or decrease number; and ending the stage when the number of increase or decrease objects set in each of the regions becomes a predetermined value as a result of the increase or decrease.

8 Claims, 18 Drawing Sheets

(56) References Cited

FOREIGN PATENT DOCUMENTS

| | | | |
|---|---|---|---|
| JP | 2000-167247 | | 6/2000 |
| JP | 2000167247 | * | 6/2000 |
| JP | 2006-167352 | | 6/2006 |
| JP | 2007-125239 | | 5/2007 |
| JP | 2010-22462 | | 2/2010 |

OTHER PUBLICATIONS

International Search Report dated May 31, 2011 from the corresponding PCT/JP2011/059799 with English-language translation thereof.
International Preliminary Report on Patentability and Written Opinion of the International Searching Authority dated Dec. 10, 2012, from corresponding International Application No. PCT/JP2011/059799.

* cited by examiner

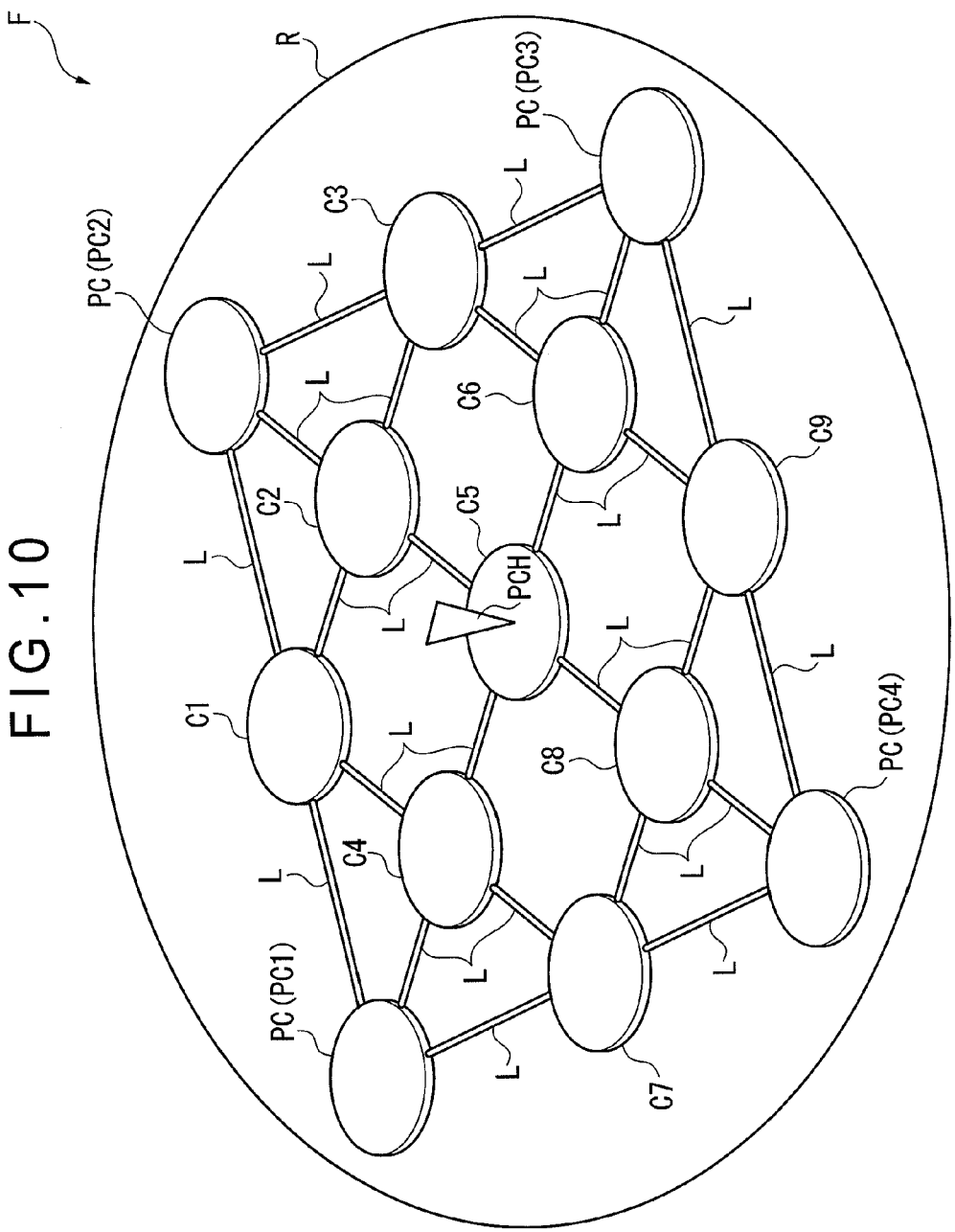

IMAGE GENERATION PROGRAM, RECORDING MEDIUM, INFORMATION PROCESSING METHOD, INFORMATION PROCESSING DEVICE AND INFORMATION PROCESSING PROGRAM FOR A PUZZLE GAME

TECHNICAL FIELD

The present technology relates to an image generating program, a recording medium, an information processing method, an information processing device, and an information processing program.

BACKGROUND ART

In related art, game devices that can execute game programs recorded on disk-shaped recording media and storage devices and game programs obtained from servers on networks and the like are known. Genres of such games include role-playing games, adventure games, shooting games, simulation games, puzzle games, and the like. Of these games, puzzle games are relatively easy in operations, and are thus liked by a wide variety of user groups irrespective of age.

There is a game known as such a puzzle game in which falling objects are rotated or moved and piled up on a game field, and the objects disappear when a predetermined condition is satisfied (see European Published Patent Application No. 1044706, for example, hereinafter referred to as Patent Document 1).

In the puzzle game described in this Patent Document 1, two "egg" blocks having a spherical shape and coupled with each other come falling onto the game field. Then, a user for example translates the two falling "egg" blocks to a left or to a right, rotates and moves the two falling "egg" blocks to the left or to the right, or makes the two falling "egg" blocks fall forcibly, and piles up the two "egg" blocks on the game field. When these two "egg" blocks fall onto the bottom of the game field or come into contact with blocks already piled up on the game field, the two "egg" blocks are broken, and other "egg" blocks adjacent to the two "egg" blocks are also broken. Thereby "contents" blocks appear. When a total of three or more "contents" blocks of a same kind are coupled with each other vertically and horizontally, all of the three "contents" blocks disappear.

In this puzzle game, when two "egg" blocks are made to fall while a predetermined button is pressed, the "egg" blocks can be piled up on the game field without being broken. Thus, when a plurality of "egg" blocks are piled up on the game field in advance such that three or more "contents" blocks are coupled to each other, and the "egg" blocks are broken by making other "egg" blocks fall onto the "egg" blocks in question, the "contents" blocks that appear can be made to disappear in a chain.

CITATION LIST

Patent Literature(s)

PATENT LITERATURE 1: European Patent Laid-Open No. 1044706

SUMMARY OF THE INVENTION

Problems to be Solved by the Invention

However, the same operations continue to be performed in the puzzle game described in the above-described Patent Document 1. Thus, even when a wide variety of presentations are made during the game, the user becomes bored easily. In addition, the game is not over unless blocks are piled up to the top of the game field. There is thus a poor sense of achievement in clearing the game, and interest in the game is dampened easily.

It is desirable to provide an image generating program, a recording medium, an information processing method, an information processing device, and an information processing program that can realize a highly entertaining game.

Means for Solving the Problems

According to an embodiment of the present technology, there is provided an image generating program executed by an image generating device, the image generating program making the image generating device perform: setting a number of increase or decrease objects in at least one of a plurality of regions on a field, the field having the plurality of regions divided from each other and connected to each other, in each stage; generating a display image including a display corresponding to the field and the set number of increase or decrease objects; generating the display image in which an increase or decrease number corresponding to a selected level is set in a region within a predetermined area with a selected region selected from the plurality of regions as a center; generating the display image in which the number of increase or decrease objects set in each of the regions is increased or decreased on a basis of the set increase or decrease number; and ending the stage when the number of increase or decrease objects set in each of the regions becomes a predetermined value as a result of the number of increase or decrease objects set in each of the regions being increased or decreased.

The plurality of regions forming the field can be disposed in the form of a lattice, for example. In this case, the number of regions disposed on one side of the lattice can be set arbitrarily. In addition, the selected region can be selected from the plurality of regions by a player character moved on the field by a user.

According to the embodiment of the present technology, the game can be configured in which the number of increase or decrease objects set in at least one region is increased or decreased on the basis of an increase or decrease number set in at least one region with the selected region selected by the user as a center, and it is determined that a stage is cleared and the stage is ended when the number of increase or decrease objects set in each region becomes a predetermined value (for example "0").

According to this, different numbers of increase or decrease objects are set in different regions in each stage, whereby stages of different set contents can be enjoyed and a sense of achievement can be imparted to the user when a stage is cleared. In addition, because an advance is made to a stage of such different settings, the same operations are not performed in each stage, so that the user does not readily become bored. Thus, a highly entertaining game can be configured.

According to the embodiment of the present technology, the image generating device is preferably made to display a position of the selected region in which the increase or decrease number is for a first move in an operation procedure for bringing the set number of increase or decrease objects in each region to the predetermined value when a first input operation is performed.

According to the embodiment of the present technology, the position of the selected region for the first move in the obtained operation procedure is displayed. According to this, even when a degree of difficulty is increased as advances are made to more advanced stages, the displayed position of the selected region serves as a hint so that it can be made easier to clear the stage in question. It is thus possible to prevent interest in the game from being dampened because an advance to a next stage cannot be made.

In the embodiment of the present technology, the image generating device is preferably made to perform: clocking an elapsed time from a time of a start of the stage; determining whether the elapsed time has reached a predetermined time; and generating another region in a vicinity of the plurality of regions in the display image when it is determined that the elapsed time has reached the predetermined time, wherein the field having the other region in addition to the plurality of regions is generated at a time of a start of a stage next to the stage in which the other region is generated.

According to the embodiment of the present technology, when it takes a predetermined time to clear one stage, the number of regions forming the field is increased in the stage next to the stage in question. Thus, in the next stage, the degree of difficulty of the game is increased as compared with the immediately preceding stage. According to this, a wide variety of stages can be configured, so that occurrence of the boredom of the user can be further reduced. In addition, the user tries to clear a stage without the number of regions being increased, so that a sense of being pressed can be imparted to the user. Therefore interest in the game can be further increased.

In the embodiment of the present technology, the image generating device is preferably made to invert the field and make a positive or negative sign of the number of increase or decrease objects in each of the regions an opposite sign when a second input operation is performed.

The display of the field and the increase or decrease objects by three-dimensional graphics for overlooking the field cannot only make it easy to grasp the whole of the field and the position of the player character moved on the field by user operation but also beautifully represent the game screen. In such a case, however, when increase or decrease objects are set on the reverse side of regions forming the field, the increase or decrease objects may not be grasped easily, depending on the position of a viewpoint for observing the field and the number of increase or decrease objects.

On the other hand, it can be made easier to grasp the number of increase or decrease objects in the regions by inverting the field and making the positive or negative sign of the number of increase or decrease objects set in each of the regions an opposite sign, that is, positioning the increase or decrease objects situated on the reverse side of the regions onto the obverse side. Thus, the operability of the game can be improved.

In addition, according to an embodiment of the present technology, there is provided a recording medium on which the above-mentioned image generating program is recorded so as to be readable by a computer.

According to the embodiment of the present technology, a computer reading and executing the image generating program recorded on the recording medium so as to be readable by a computer can produce similar effects to those of an information processing device for executing the above-described image generating program. In addition, a magnetic tape, a magnetic disk, an optical disk, a magneto-optical disk, an HDD (Hard Disk Drive), a semiconductor memory, and the like can be used as the recording medium. The use of these recording media not only enables the image generating program to be installed and executed on a computer but also facilitates the distribution of the image generating program.

In addition, according to an embodiment of the present technology, there is provided an information processing method performed using an information processing device, the information processing method including: setting a number of increase or decrease objects in at least one of a plurality of regions on a field, the field having the plurality of regions divided from each other and connected to each other, in each stage; setting an increase or decrease number corresponding to a selected level in a region within a predetermined area with a selected region selected from the plurality of regions as a center; increasing or decreasing the number of increase or decrease objects set in each of the regions on a basis of the set increase or decrease number; and ending the stage when the number of increase or decrease objects set in each of the regions becomes a predetermined value as a result of the number of increase or decrease objects set in each of the regions being increased or decreased.

The information processing method according to the embodiment of the present technology can produce similar effects to those of the above-described image generating program.

In addition, according to an embodiment of the present technology, there is provided an information processing device including: an object setting portion configured to set a number of increase or decrease objects in at least one of a plurality of regions on a field, the field having the plurality of regions divided from each other and connected to each other, in each stage; an increase and decrease number setting portion configured to set an increase or decrease number corresponding to a selected level in a region within a predetermined area with a selected region selected from the plurality of regions as a center; an increasing and decreasing portion configured to increase or decrease the number of increase or decrease objects set in each of the regions on a basis of the set increase or decrease number; and a stage ending portion configured to end the stage when the number of increase or decrease objects set in each of the regions becomes a predetermined value as a result of the number of increase or decrease objects set in each of the regions being increased or decreased by the increasing and decreasing portion.

The information processing device according to the embodiment of the present technology can produce similar effects to those of an information processing device for executing the above-described image generating program.

In addition, according to an embodiment of the present technology, there is provided an information processing program executed by an information processing device, the information processing program making the information processing device function as: an object setting portion configured to set a number of increase or decrease objects in at least one of a plurality of regions on a field, the field having the plurality of regions divided from each other and connected to each other, in each stage; an increase and decrease number setting portion configured to set an increase or decrease number corresponding to a selected level in a region within a predetermined area with a selected region selected from the plurality of regions as a center; an increasing and decreasing portion configured to increase or decrease the number of increase or decrease objects set in each of the regions on a basis of the set increase or decrease number; and a stage ending portion configured to end the stage when the number of increase or decrease objects set in each of the regions becomes a predetermined value as a result of the number of increase or decrease objects set in each of the regions being increased or decreased by the increasing and decreasing portion.

The information processing program according to the embodiment of the present technology can produce similar effects to those of the above-described image generating program.

Advantage(s) of the Invention

According to the embodiment of the present technology, a highly entertaining game can be realized in which the user can be readily provided with a sense of achievement and the user does not become bored easily.

BRIEF DESCRIPTION OF THE DRAWINGS

FIG. 10 is a diagram of assistance in explaining the cells and the ring in the first embodiment;

DESCRIPTION OF EMBODIMENT(S)

First Embodiment

A first embodiment of the present technology will hereinafter be described with reference to the drawings.

[Configuration of Information Processing Device]

Figure 1:
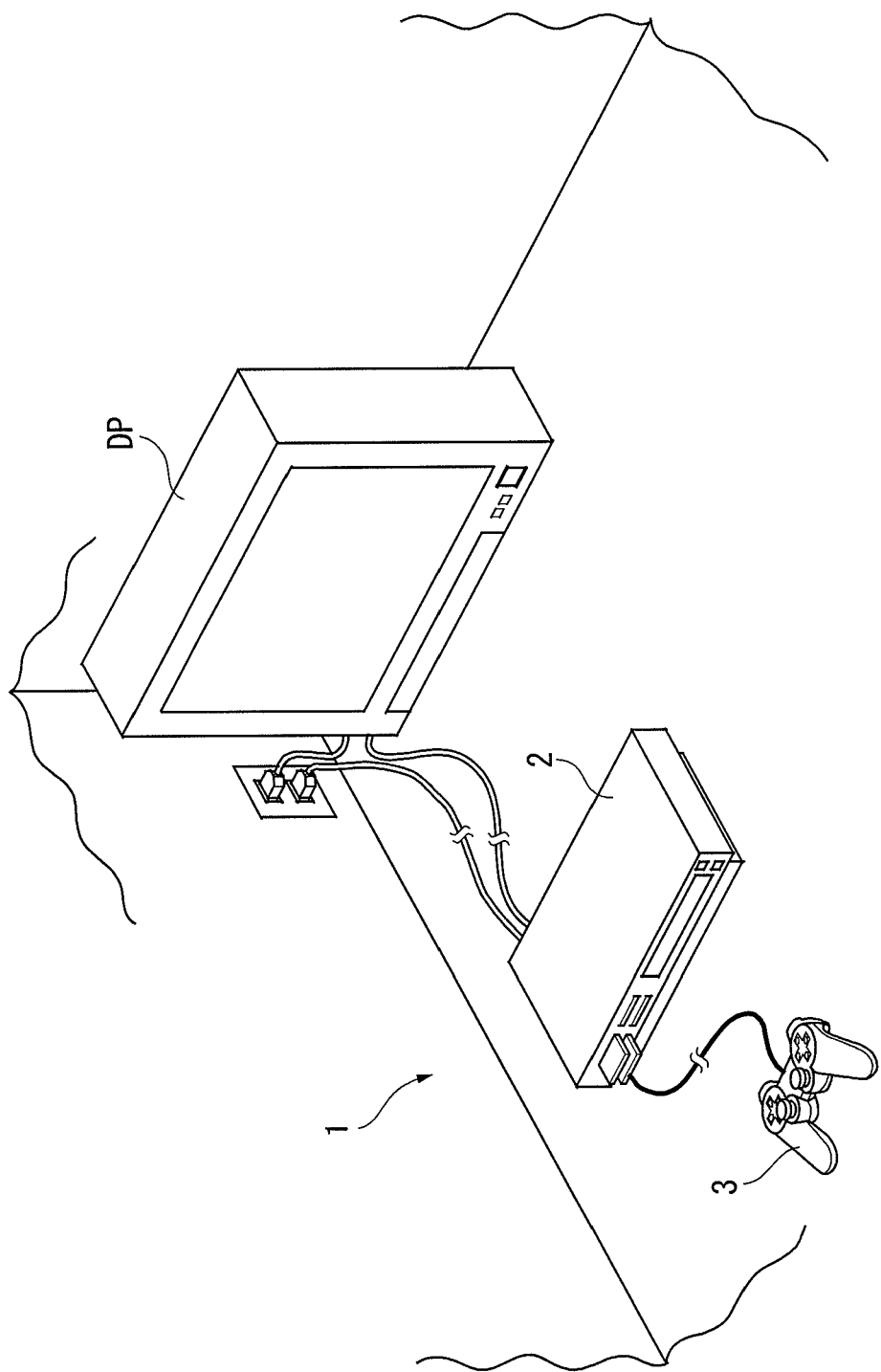
FIG. 1 is a schematic diagram showing a configuration of an information processing device according to a first embodiment of the present technology.

FIG. 1 is a schematic diagram showing an information processing device 1 according to the present embodiment.

The information processing device 1 according to the present embodiment processes various kinds of programs according to user operations, and performs processing according to the programs. Thus, the information processing device 1 functions as a game device when the information processing device processes a game program, functions as an image generating device when processing an image generating program, and functions as an information processing device when processing an information processing program.

As shown in FIG. 1, such an information processing device 1 includes a device main body 2 and a controller 3 operated by a user. The device main body 2 transmits the image data of a screen at a time of execution of a program (which screen is for example a game screen GS (see FIG. 3)) to a display DP to make the screen at the time of the execution displayed on the display DP.

Figure 2:
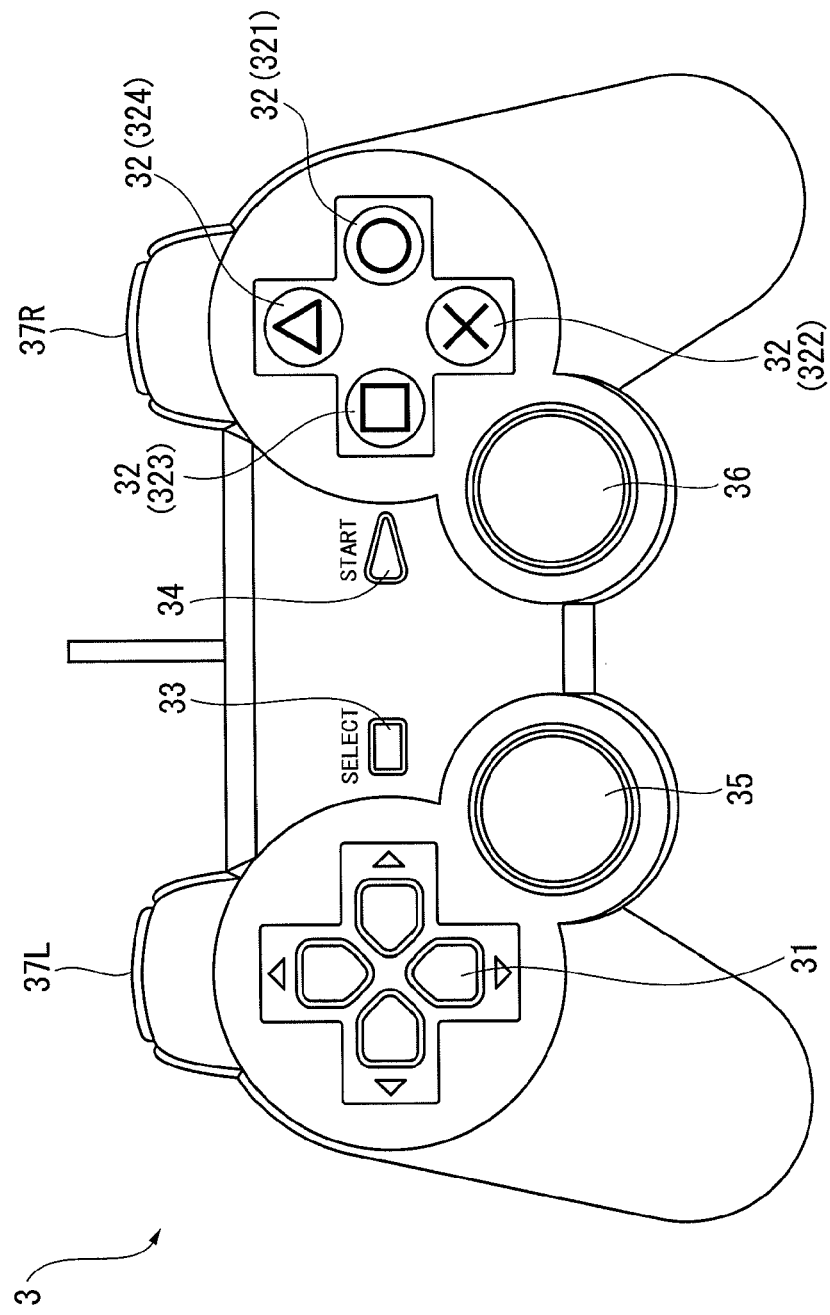
FIG. 2 is a plan view of a controller in the first embodiment.

FIG. 2 is a plan view of the controller 3.

As shown in FIG. 2, the controller 3 has, on a front surface thereof, an up, a down, a left, and a right direction keys 31 for moving a player character PCH (see FIG. 3) in a game to be described later, four keys 32 (321 to 324), a selecting key 33 and a starting key 34 disposed between the direction keys 31 and the keys 32, and analog operating parts 35 and 36. Of these constituent elements, the analog operating parts 35 and 36 are disposed so as to project from the main body of the controller 3, and are formed in the shape of a joystick tiltable with respect to the main body of the controller 3. In addition, keys 37L and 37R are disposed at a left and a right of an upper surface of the controller 3.

Such a controller 3 transmits an operating signal corresponding to a pressed key to the device main body 2.

[Description of Game]

A game executed by the information processing device 1 will be described in the following.

The game according to the present embodiment is a so-called puzzle game, and is composed of a plurality of chapters each having a plurality of stages. In each stage, a player character displayed on a game screen is operated, obstacles (cubes) arranged on a plurality of cells forming a field are erased by exerting a negative or positive acting force, and the stage in question is cleared when all the obstacles are erased. In addition, when a time limit set in each stage is reached, the game is over.

In addition, when each stage is cleared, a score calculated according to a remaining time, the number of operations in erasing the obstacles, and the like is added, and stage evaluation is made according to the remaining time, the number of operations, and the like.

[Description of Game Screen]

Figure 3:
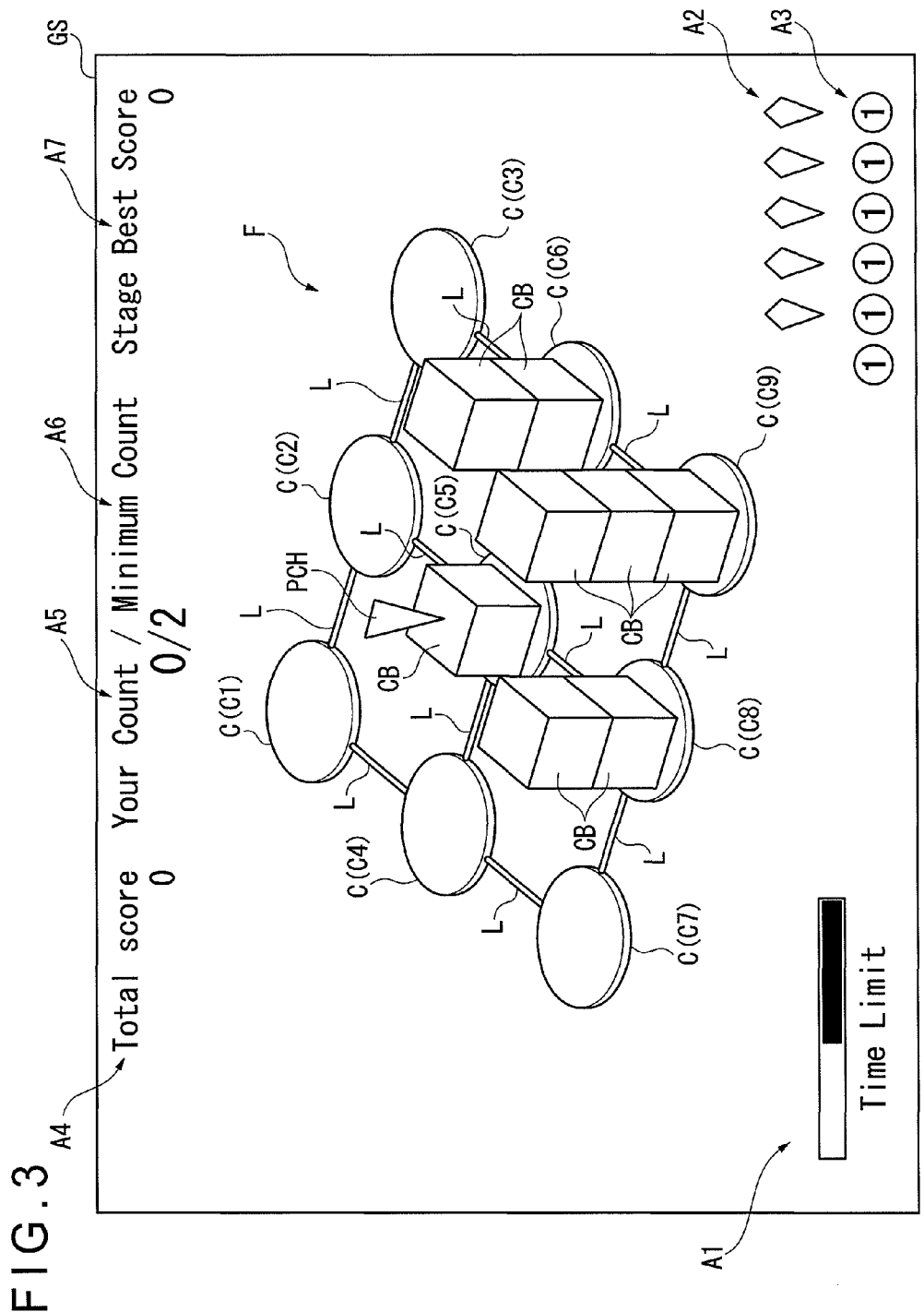
FIG. 3 is a diagram showing an example of a game screen in the first embodiment.

FIG. 3 is a diagram showing an example of a game screen GS.

As shown in FIG. 3, a field F is disposed in the center of the game screen GS in this game. This field F has nine cells C (C1 to C9) divided from each other and adjacent to each other.

These cells C in the present embodiment are disposed so as to correspond to the positions of vertices of a lattice with three longitudinal columns and three lateral rows. The cells C are connected to each other by a line L extending out longitudinally and laterally. The player character (which may hereinafter be abbreviated to a "character") PCH moves on the plurality of cells C longitudinally or laterally according to an input operation on the direction keys 31. In other words, the movement of the character PCH from a certain cell C to another cell C not directly connected to the certain cell C by one line L is limited.

As will be described later in detail, a maximum of four cells are added to these cells C when a certain condition holds (see FIG. 10).

At a time of a start of each stage, a cube CB as an obstacle object having a cubic shape is automatically disposed as an increase or decrease object on at least one of such cells C. This cube CB is disposed on not only the obverse side of the cell C but also the reverse side of the cell C in some cases.

Such a field F can be observed from a viewpoint that is changed by operating the analog operating parts 35 and 36 (FIG. 2).

A first region A1, which is a time limit display region in which a gauge indicating a time limit in one stage is set, is provided on a lower left side of the game screen GS. In addition, a second region A2, which is a number-of-hints display region indicating the number of times that a hint for clearing a stage can be requested, and a third region A3, which is a number-of-executions display region indicating the number of times that an operation for increasing or decreasing cubes CB by one can be performed, are provided on a lower right side of the game screen GS. The number of times that a hint for clearing a stage can be requested is represented by the number of displayed polygons. The number of times that an operation for increasing or decreasing cubes CB by one can be performed is represented by the number of displayed circles enclosing "1."

A fourth region A4, which is a score display region displaying a total score, is provided on an upper left side of the game screen GS. A fifth region A5 indicating the number of user operations (the number of times of pressing the key 321) for erasing cubes CB in one stage is provided in an upper center of the game screen GS. A sixth region A6 indicating a minimum number of operations for erasing all cubes CB set at a time of a start of the game is provided on a right side of the fifth region A5 so as to be adjacent to the fifth region A5. Further, a seventh region A7 indicating a best score in the past in the stage in question is provided on an upper right side of the game screen GS.

[Progress of Game]

The game in which the game screen GS described above is displayed progresses as follows.

First, as described above, a cube CB is automatically disposed on at least one of a plurality of cells C at a start of the game. In response to this, a user moves the character PCH, and performs operations for erasing cubes CB on the obverse side and the reverse side.

When erasing a cube CB, the user can select and perform one of a first operation for exerting an acting force (acting force at a first level) for increasing or decreasing cubes CB by one on a cell C at which the character PCH is positioned (which cell C is an active cell, and corresponds to a selected region according to an embodiment of the present technology) and a second operation for exerting an acting force (acting force at a second level or a third level) for increasing or decreasing cubes CB on a plurality of cells C within a predetermined area from the cell C at which the character PCH is positioned.

Figure 4:
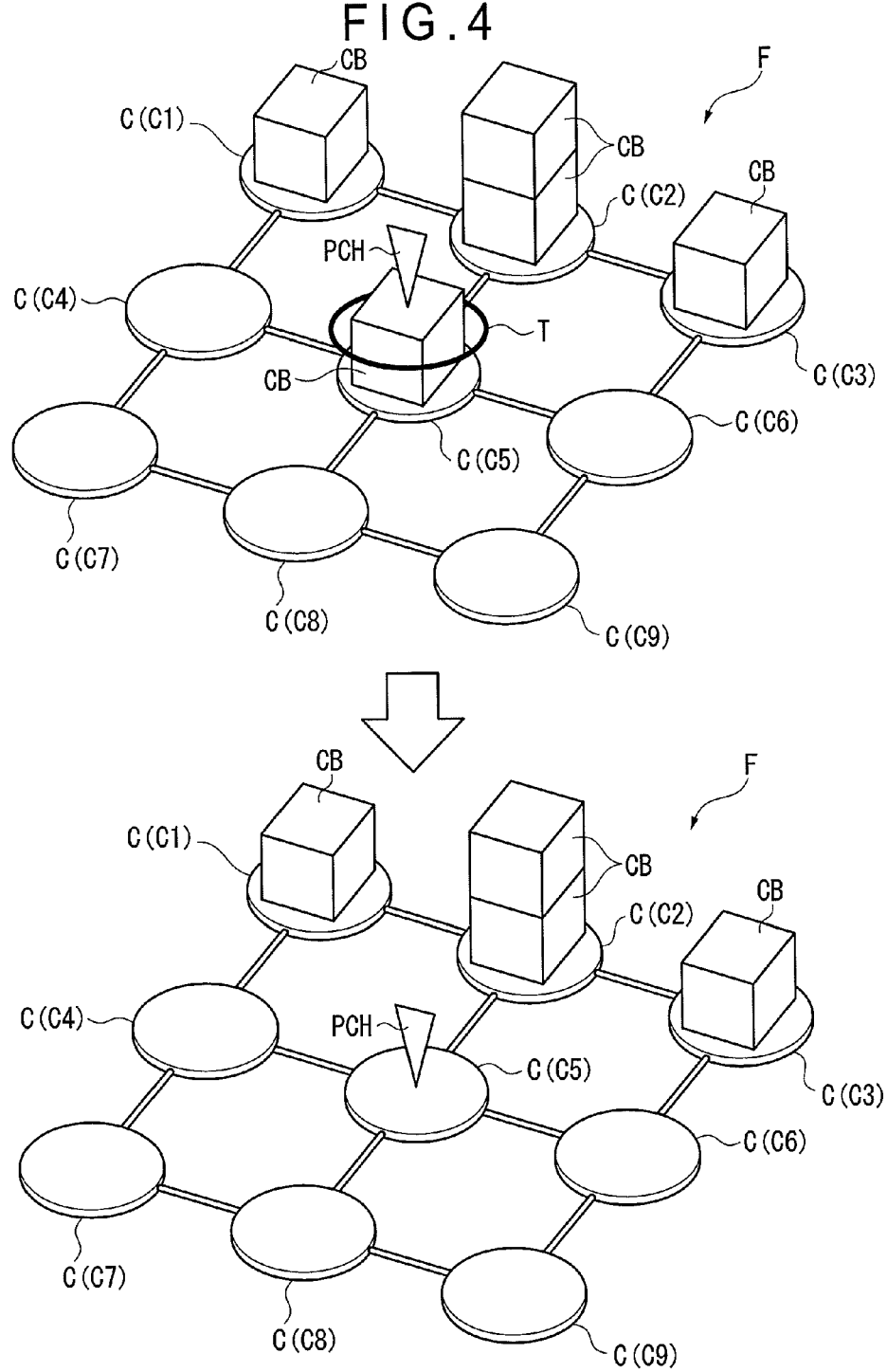
FIG. 4 is a diagram showing an increase or decrease of cubes in the first embodiment.

FIG. 4 is a diagram showing the increase or decrease of cubes CB.

The first operation is an operation of pressing the key 37L or the key 37R once and thereafter pressing the key 321. The acting force at the first level is thereby exerted.

Specifically, when the key 37L is pressed once, as shown in an upper part of FIG. 4, for example, one annular object T having substantially the same size as the cell C at which the character PCH is positioned (cell C5 in the example in the upper part of FIG. 4) appears at the cell C in question.

This annular object T indicates an increase or decrease number according to an embodiment of the present technology, and indicates a decrease number of "1" for the number of cubes CB set on the obverse side of the cell C and indicates an increase number of "1" for the number of cubes CB set on the reverse side of the cell C. The annular object T also indicates that a negative acting force for erasing one cube CB positioned on the obverse side of the cell C at which the annular object T in question is set is to be exerted. When the key 321 is pressed in a state of this one annular object T appearing, and a cube CB is disposed on the obverse side of the cell C to which the annular object T is set, the one cube CB on the obverse side is erased, as shown in a lower part of FIG. 4, for example. In addition, when no cube CB is disposed on the obverse side of the cell C to which the annular object T is set, one cube CB is added to the reverse side of the cell C in question. Then, after the cubes CB are increased or decreased, the annular object T disappears.

In addition, though not shown in the figures, when the key 37R is pressed once, one annular object of a different color from that of the annular object T described above appears at an active cell C.

As with the annular object T described above, this annular object indicates an increase or decrease number according to the embodiment of the present technology, and indicates an increase number of "1" for the number of cubes CB set on the obverse side of the cell C and indicates a decrease number of "1" for the number of cubes CB set on the reverse side of the cell C.

That is, the annular object indicates that a positive acting force for erasing one cube CB positioned on the reverse side of the cell C in question is to be exerted. When the key 321 is pressed in a state of this one annular object appearing, and a cube CB is disposed on the reverse side of the cell C to which the annular object is set, the one cube CB in question is erased. When no cube CB is disposed on the reverse side of the cell C, one cube CB is added to the obverse side of the cell C in question. Then, as in the above-described case, after the cubes CB are increased or decreased, the annular object T disappears.

Incidentally, when a positive or negative acting force is exerted by pressing the key 321 after the key 37L or the key 37R is pressed once, one is subtracted from the number of times displayed in the third region A3. Then, when the number of times is "0," the performance of the above-described first operation is restrained.

Figure 5:
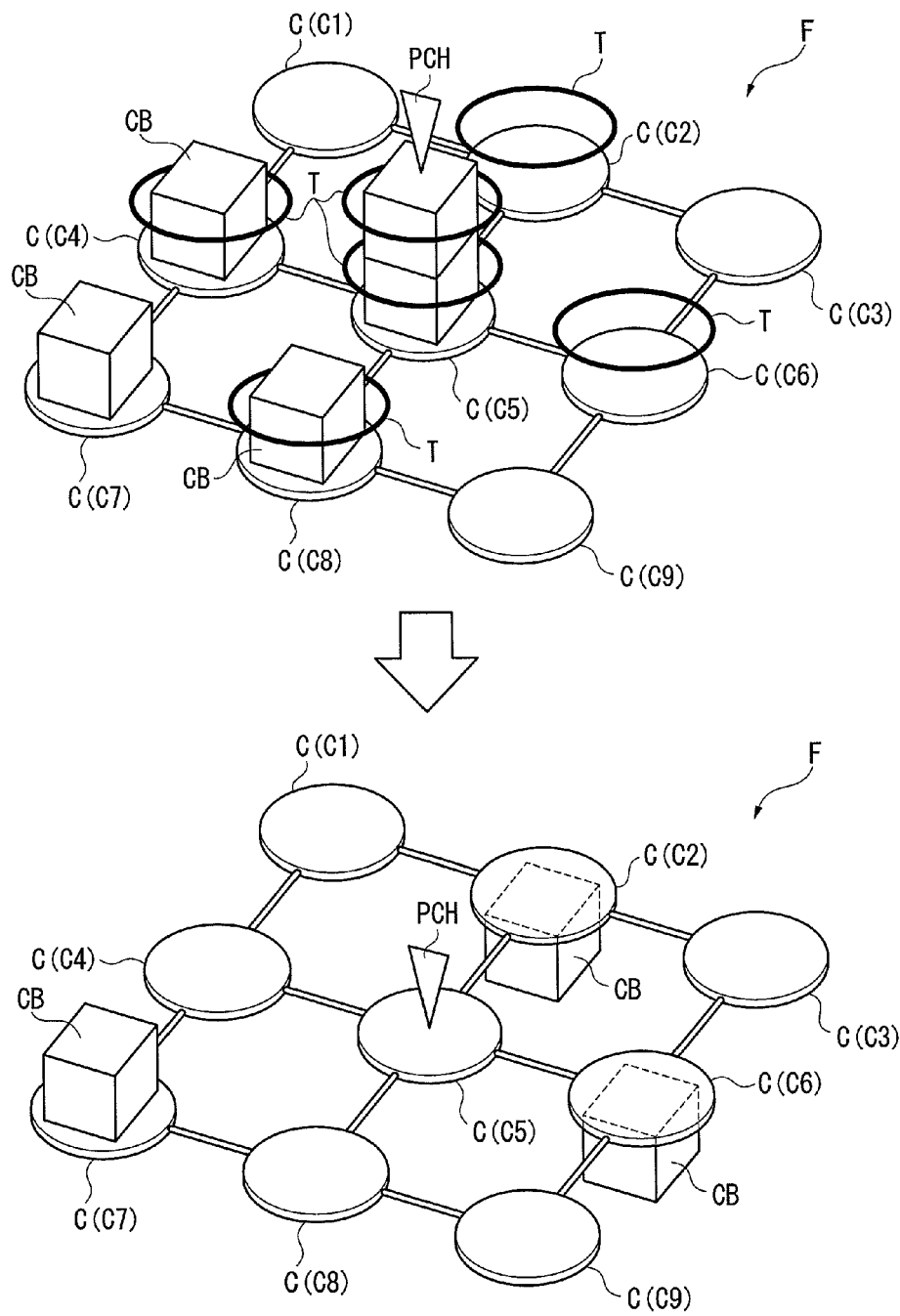
FIG. 5 is a diagram showing an increase or decrease of cubes in the first embodiment.

FIG. 5 is a diagram showing the increase or decrease of cubes CB. Specifically, FIG. 5 is a diagram showing the increase or decrease of cubes CB when the key 37L is pressed twice.

The second operation is an operation for exerting an acting force at the second level or the third level by pressing the key 37L or the key 37R a plurality of times (twice or three times) and thereafter pressing the key 321.

When the key 37L is pressed twice, annular objects T as described above appear at an active cell C and cells C located within a predetermined area with the active cell C as a center. Specifically, annular objects T indicating that a negative acting force is to be exerted appear at the active cell C and the cells C connected to the active cell C via one line L. At this time, two annular objects T appear at the active cell C, and one annular object T appears at each of the cells C connected to the active cell C by one line L.

Thus, as shown in an upper part of FIG. 5, for example, when the key 37L is pressed twice in a case where the character PCH is positioned at the cell C5, two annular objects T appear at the cell C5, and one annular object T appears at the cells C2, C4, C6, and C8 connected to the cell C5.

When the key 321 is pressed in a state of the plurality of annular objects T thus appearing, as in the case where the above-described first operation is performed, the negative acting force is exerted on the cells C at which the annular objects T are positioned by amounts corresponding to the numbers of such annular objects T. At this time, at the cells C at which the annular objects T are positioned, the numbers of cubes CB disposed on the obverse side are decreased by the numbers of such annular objects T, or numbers of cubes CB which numbers are obtained by subtracting the numbers of cubes CB on the obverse side from the numbers of annular objects T are added to the reverse side. Each of the annular objects T thereafter disappears. Thus, when one cube CB is disposed on the obverse side of the active cell C at which the two annular objects T are positioned, the cube CB is erased, and one cube CB is added to the reverse side.

For example, when the key 321 is pressed in the state shown in the upper part of FIG. 5, because the two cubes CB have been disposed on the obverse side of the active cell C5, the two cubes CB in question are both erased by the negative acting force exerted by the two annular objects T, as shown in a lower part of FIG. 5. In addition, at each of the cells C4 and C8 on the obverse side of which one cube CB has been disposed, the one cube CB in question is erased by the negative acting force exerted by one annular object T. On the other hand, at each of the cells C2 and C6 on the obverse side of which no cube CB has been disposed, one cube CB corresponding to the number of annular objects T is added to the reverse side of each of the cells C2 and C6 by the negative acting force exerted by one annular object T.

Similarly, when the key 37R is pressed twice, annular objects indicating that a positive acting force is to be exerted appear at an active cell C (for example, the cell C5) and cells C located within a predetermined area with the active cell C as a center (for example, the cells C2, C4, C6, and C8 connected to the cell C5 via one line L). At this time, two such annular objects appear at the active cell C, and one such annular object appears at each of the other cells C.

Then, when the key 321 is pressed in this state, at the cells C at which the annular objects are positioned, the numbers of cubes CB disposed on the reverse side are decreased according to the numbers of such annular objects, or numbers of cubes CB which numbers are obtained by subtracting the numbers of cubes CB on the reverse side from the numbers of such annular objects are added to the obverse side. Each of the annular objects thereafter disappears.

Incidentally, when the active cell C is not located at the center of the lattice formed by the cells C, annular objects are set at cells C as follows.

For example, when the active cell C is the cell C1, and the key 37L is pressed twice, two annular objects T are set at the cell C1, and one annular object T is set at the cells C (C2 and C4) connected to the cell C1 via one line L.

In addition, when the active cell C is the cell C2, and the key 37L is pressed twice, two annular objects T are set at the cell C2, and one annular object T is set at the cells C (C1, C3, and C5) connected to the cell C2 via one line L.

Also in a case where the key 321 is pressed in such a state, a similar process to the above-described process is performed. The same is also true for a case where the key 37R is pressed twice.

Figure 6:
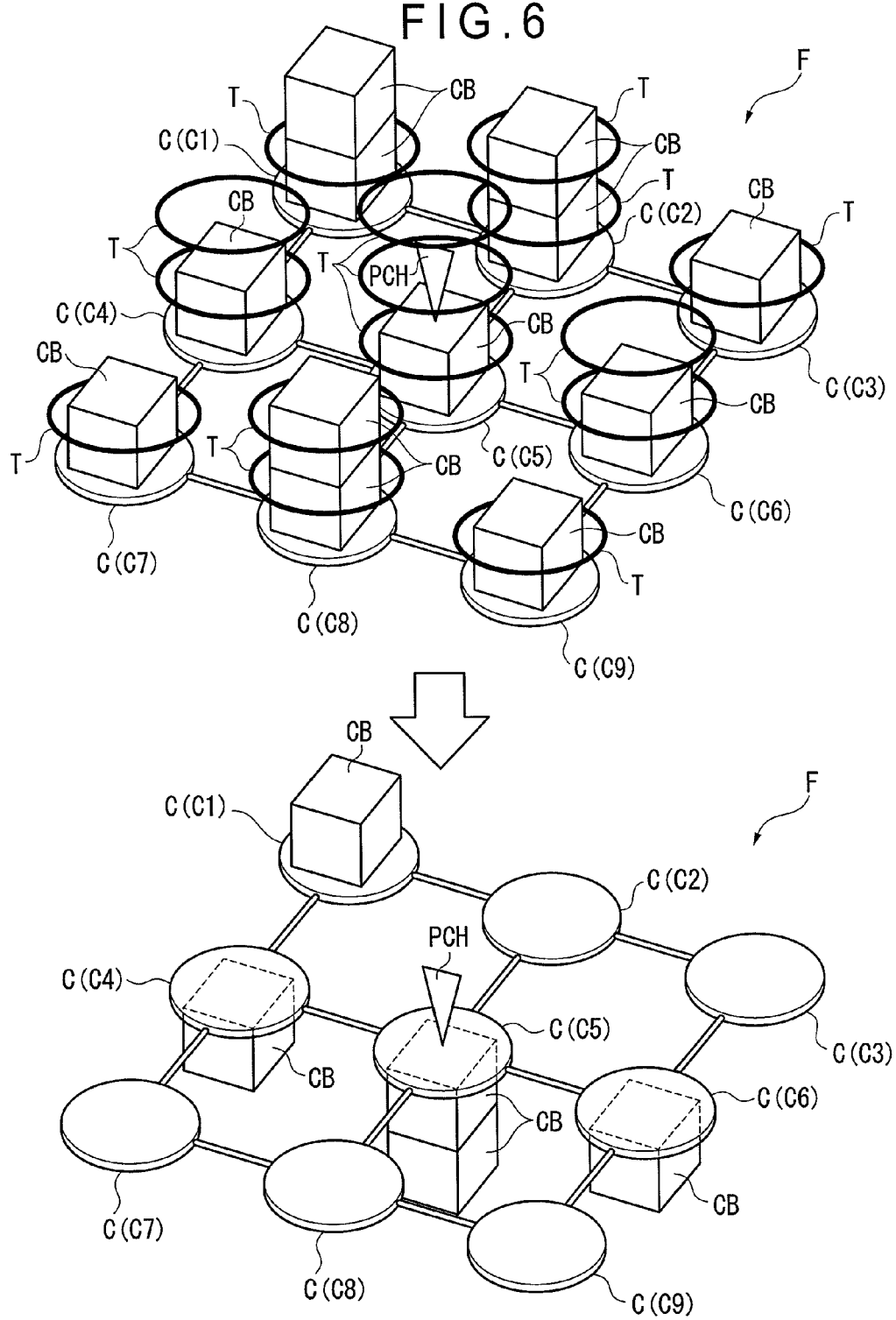
FIG. 6 is a diagram showing an increase or decrease of cubes in the first embodiment.

FIG. 6 is a diagram showing the increase or decrease of cubes CB. Specifically, FIG. 6 is a diagram showing the increase or decrease of cubes CB when the key 37L is pressed three times.

When the key 37L is pressed three times, annular objects T as described above appear at an active cell C and cells C located within an area larger than when the key 37L is pressed twice with the active cell C as a center. That is, when the key 37L is pressed three times, annular objects T appear at the active cell C and the cells C connected to the active cell C by two lines L or less.

Specifically, annular objects T appear at the active cell C, the cells C connected to the active cell C via one line L, and the cells C connected to these cells C via one line L. At this time, three annular objects T appear at the active cell C, two annular objects T appear at each of the cells C connected to the active cell C, and one annular object T appears at each of the cells C connected to these cells C.

Thus, as shown in an upper part of FIG. 6, for example, when the key 37L is pressed three times in a case where the character PCH is positioned at the cell C5, three annular objects T appear at the cell C5, two annular objects T appear at the cells C2, C4, C6, and C8, and one annular object T appears at the cells C1, C3, C7, and C9.

When the key 321 is pressed in such a state, as in the case where the key 37L is pressed twice, at the cells C at which the annular objects T are positioned, the numbers of cubes CB disposed on the obverse side are decreased according to the numbers of annular objects T, or numbers of cubes CB which numbers are obtained by subtracting the numbers of cubes disposed on the obverse side from the numbers of annular objects T are added to the reverse side. Each of the annular objects T thereafter disappears.

For example, when the key 321 is pressed in the state shown in the upper part of FIG. 6, because one cube CB has been disposed on the obverse side of the active cell C5, the one cube CB in question is erased and two cubes CB appear on the reverse side of the cell C5 by the negative acting force exerted by the three annular objects T, as shown in a lower part of FIG. 6.

In addition, at each of the cells C2 and C8 on the obverse side of which two cubes CB have been disposed, the two cube CB in question are erased by the negative acting force exerted by two annular objects T, and no cube CB appears on the reverse side of the cell C2 nor C8. However, at the cells C4 and C6 on the obverse side of which one cube CB has been disposed, the one cube CB in question is erased, and one cube CB appears on the reverse side.

Similarly, at the cell C1 on the obverse side of which two cubes CB have been disposed, one of the two cubes CB in question is erased by the negative acting force exerted by one annular object T. At the cells C3, C7, and C9 on the obverse side of which one cube CB has been disposed, the one cube CB in question is erased by the negative acting force exerted by one annular object T.

On the other hand, when the key 37R is pressed three times, annular objects indicating that a positive acting force is to be exerted appear in a same number at same positions as the annular objects T appearing when the key 37L is pressed three times. Also in a case where the key 321 is pressed in this state, at the cells C at which the annular objects are positioned, the numbers of cubes CB disposed on the obverse side are decreased according to the numbers of annular objects T, or numbers of cubes CB which numbers are obtained by subtracting the numbers of cubes disposed on the reverse side from the numbers of annular objects T are added to the reverse side. Each of the annular objects T thereafter disappears.

Incidentally, in a case where the active cell C is not located at the center of the field F when the key 37L or the key 37R is pressed three times, as in the above-described cases, annular objects (including annular objects T) appear at only the cells C connected to the active cell C via one line L and two lines L. In other words, no annular objects appear at the positions of nonexistent cells.

In addition, when the negative or positive acting force is exerted by pressing the key 321 after the key 37L or the key 37R is pressed a plurality of times as described above, the number of times displayed in the third region A3 is not reduced. That is, no limit is set to the number of times of the second operation.

As described above, the area on which the negative or positive acting force is exerted is increased according to the number of times of pressing of the key 37L or the key 37R with the active cell C as a center. In addition, the acting force is increased toward the center of the area (that is, the active cell C).

[Inversion of Field]

Figure 7:
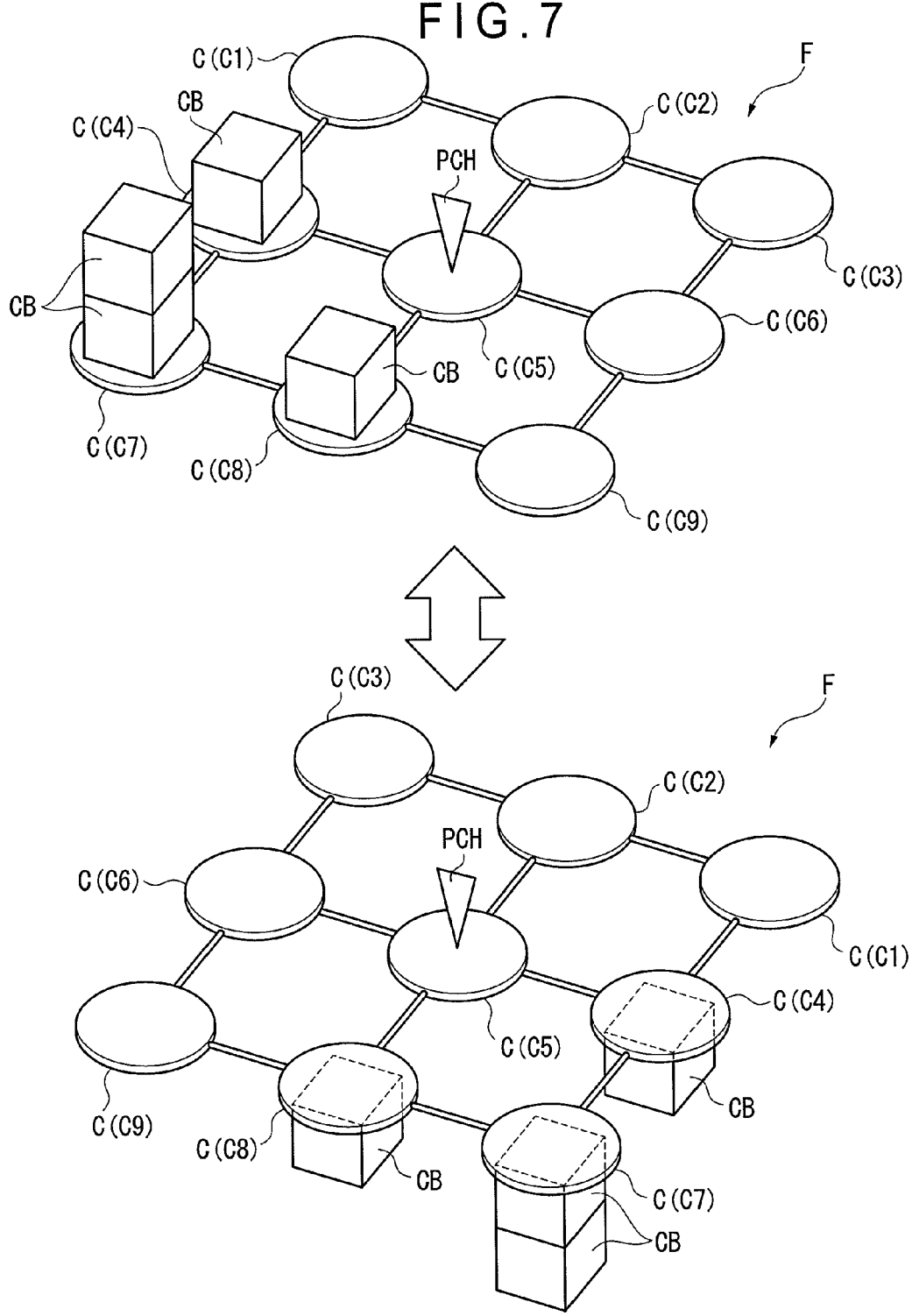
FIG. 7 is a diagram showing an inverted state of a field in the first embodiment.

FIG. 7 is a diagram showing an inverted state of the field F when the key 324 has been pressed.

As shown in FIG. 7, the above-described field F is inverted about a center line or a diagonal line of the field F according to an operation of pressing the key 324 (second pressing operation according to an embodiment of the present technology). Thus, inverting the field F facilitates the grasping of for example the numbers of cubes CB situated on the reverse sides of cells C.

Incidentally, the position of the character PCH on the field F before the inversion is not changed after the inversion. Thus, when the character PCH is positioned on the obverse side of the cell C5, for example, the character PCH is disposed on the reverse side of the cell C5 after the inversion of the field F. In addition, when the character PCH is positioned on the obverse side of the cell C4, the character PCH is disposed on the reverse side of the cell C6 after the inversion of the field F.

[Display of Hints]

Figure 8:
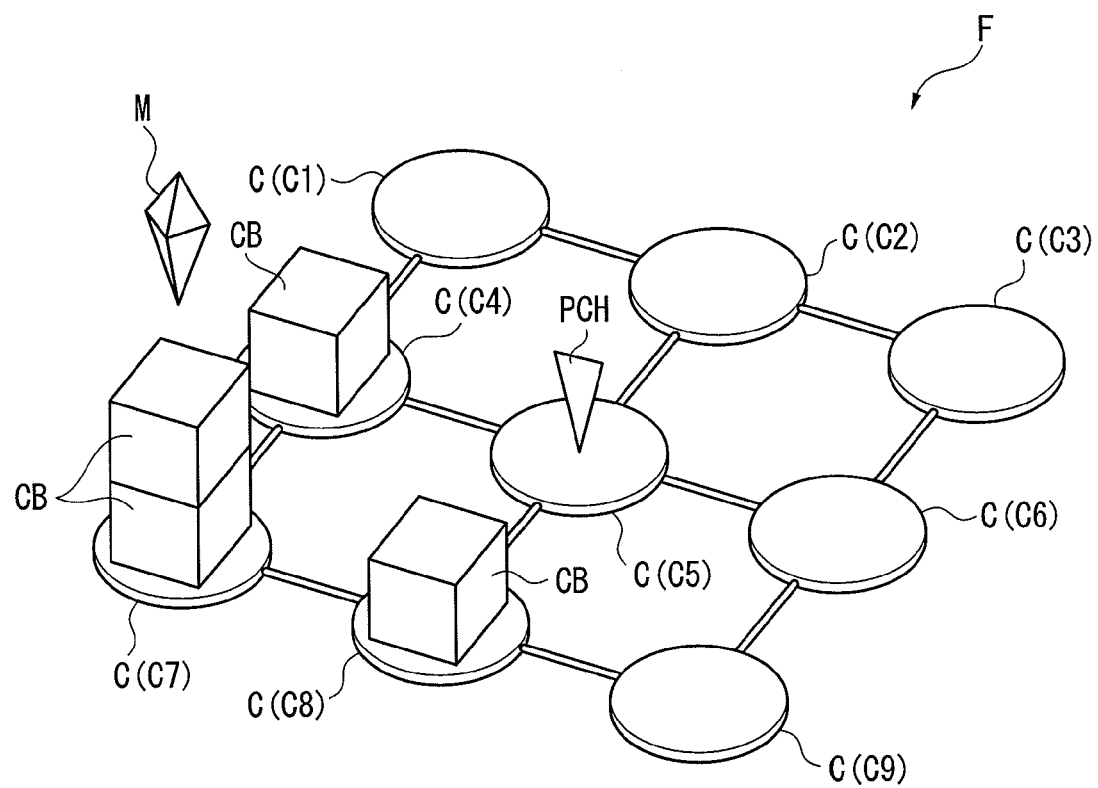
FIG. 8 is a diagram showing the field with a marker displayed in the first embodiment.

FIG. 8 is a diagram showing a state of the field F when a marker M is displayed by pressing the selecting key 33.

As a stage progresses in the game according to the present embodiment, the numbers of cubes CB arranged on cells C and the arrangement positions of the cubes CB are changed, so that a degree of difficulty is increased. There is thus a possibility that the stage cannot be cleared and an advance to a next stage cannot be made, so that the interest of the user may be dampened.

In order to deal with this, a hint for clearing the stage in question is displayed while the selecting key 33 (see FIG. 2) is pressed (first pressing operation according to an embodiment of the present technology). This hint indicates the position of a cell C for a first move in an operation procedure (one sample of solutions to the problem) for erasing each of cubes CB from an arranged state of the cubes CB at a start of the stage in question with a minimum number of operations (number of operations of pressing the key 321). The position of the cell C is indicated by a marker M having the shape of a hexahedron displayed in the vicinity of the cell C.

For example, in FIG. 8, the marker M indicates that the central cell C to which to set an annular object first in the operation procedure is the cell C7.

Incidentally, such a hint can be displayed when the number of times displayed in the above-described second region A2 is not "0" at a time of reaching the stage, and is not displayed when the number of times displayed in the above-described second region A2 is "0" at the time of reaching the stage.

Incidentally, when the key 322 is pressed, the acting force (negative and positive acting force) exerted immediately before by pressing the key 321 is cancelled, and the cubes CB increased or decreased by exerting the acting force return to a state before the pressing of the key 321. Thus, pressing the key 322 a predetermined number of times returns the arrangement of the cubes CB to the state at the time of the start of the stage.

[Increasing Cells]

FIGS. 9A to 9D and FIG. 10 are diagrams showing cells PC and a ring R appearing on the outside of the cells C1 to C9. Specifically, FIGS. 9A to 9D are diagrams showing the order of display of the cells PC. FIG. 10 is a diagram showing the field F including the cells PC and the cells C1 to C9.

As described above, the game according to the present embodiment is over when a remaining time in a certain stage becomes "0." Before the game is over, as the remaining time decreases, cells PC (PC1 to PC4) as penalties on the user sequentially appear on the outside of the cells C1 to C9, and a ring R enclosing these cells C1 to C9 and PC appears at the same time as the appearance of the cells PC, as shown in FIGS. 9A to 9D and FIG. 10.

Figure 9A:
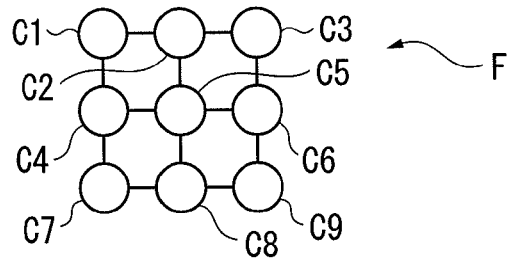
FIG. 9A is a diagram of assistance in explaining cells and a ring appearing anew in the first embodiment.
Figure 9B:
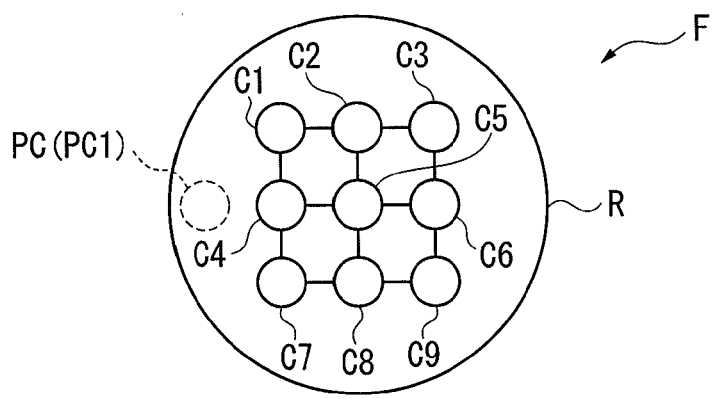
FIG. 9B is a diagram of assistance in explaining the cells and the ring appearing anew in the first embodiment.

Specifically, the arranged state of the cells C of the field F at a start of a stage is an arranged state shown in FIG. 9A. When an elapsed time becomes a time set in advance for each degree of difficulty in each stage, and a remaining time decreases, as shown in FIG. 9B, a cell PC1 appears on the outside (on an opposite side from the cell C5) of the cell C4. Together with the appearance of the cell PC1, a ring R appears which encloses these cells C1 to C9 and PC1 and cells PC2 to PC4 that are to appear.

Figure 9C:
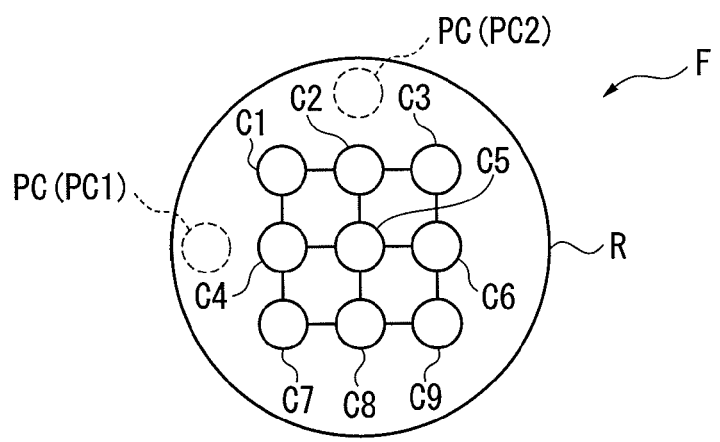
FIG. 9C is a diagram of assistance in explaining the cells and the ring appearing anew in the first embodiment.
Figure 9D:
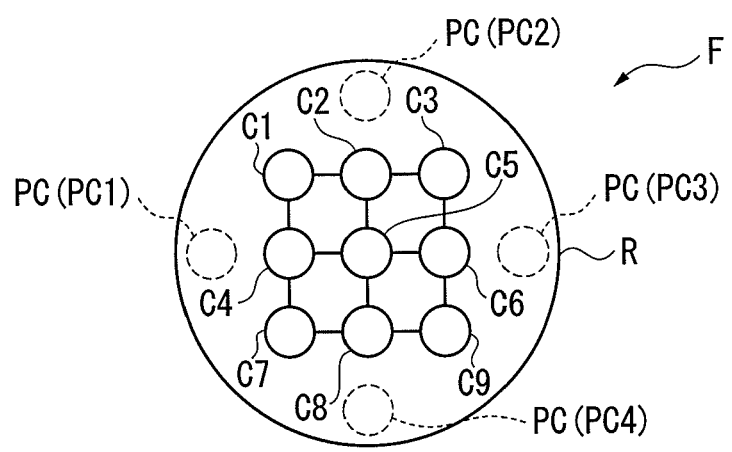
FIG. 9D is a diagram of assistance in explaining the cells and the ring appearing anew in the first embodiment.

When the remaining time further decreases, as shown in FIG. 9C, a cell PC2 appears on the outside (on an opposite side from the cell C5) of the cell C2. Then, as the remaining time decreases, as shown in FIG. 9D, cells PC3 and PC4 sequentially appear on the outside of the cell C6 and on the outside of the cell C8 (each on an opposite side from the cell C5). Incidentally, these cells PC are not effective in the stage in the middle of which the cells PC appear. That is, the cells PC and the cells C may not be connected to each other by line L in the stage in the middle of which the cells PC appear. Thus, the character PCH cannot be moved to the cells PC, nor are cubes or annular objects disposed at the cells PC.

Such cells PC (PC1 to PC4) are erased according to an evaluation made after the stage is ended. For example, when a best grade is given among grades as a plurality of levels (four levels in the present embodiment), all the cells PC are erased, and a next stage is played using the field F formed by the cells C1 to C9. When a second best grade is given, one cell PC is erased. When the other grades are given, no cells PC are erased. Thus, when a grade in a case of the stage being cleared with all the cells PC1 to PC4 appearing is one of the other grades mentioned above, as shown in FIG. 10, the next stage is played on the field F including the cells PC1 to PC4 in addition to the cells C1 to C9, and the cells PC become effective in the next stage. Cubes CB may be disposed also on these cells PC1 to PC4 at a time of a start of the stage.

In this field F, the cell PC1 is connected to each of the cells C1, C4, and C7 in the vicinity of the cell PC1 by one line L, and the cell PC2 is connected to each of the cells PC1 to PC3 in the vicinity of the cell PC2 by one line L. In addition, the cell PC3 is connected to each of the cells C3, C6, and C9 in the vicinity of the cell PC3 by one line L, and the cell PC4 is connected to each of the cells C7 to C9 in the vicinity of the cell PC4 by one line L. The character PCH can therefore move to each of the cells PC1 to PC4. Annular objects (including annular objects T) as described above are set also at each of the cells PC1 to PC4 according to operations of pressing the key 37L or the key 37R by the user.

Therefore, when the cell PC1 is active and the key 37L is pressed twice, for example, two annular objects T are set at the cell PC1, and one annular object T is set at the cells C1, C4, and C7 connected to the cell PC1 by one line L.

[Game in Reservation Mode]

Figure 11:
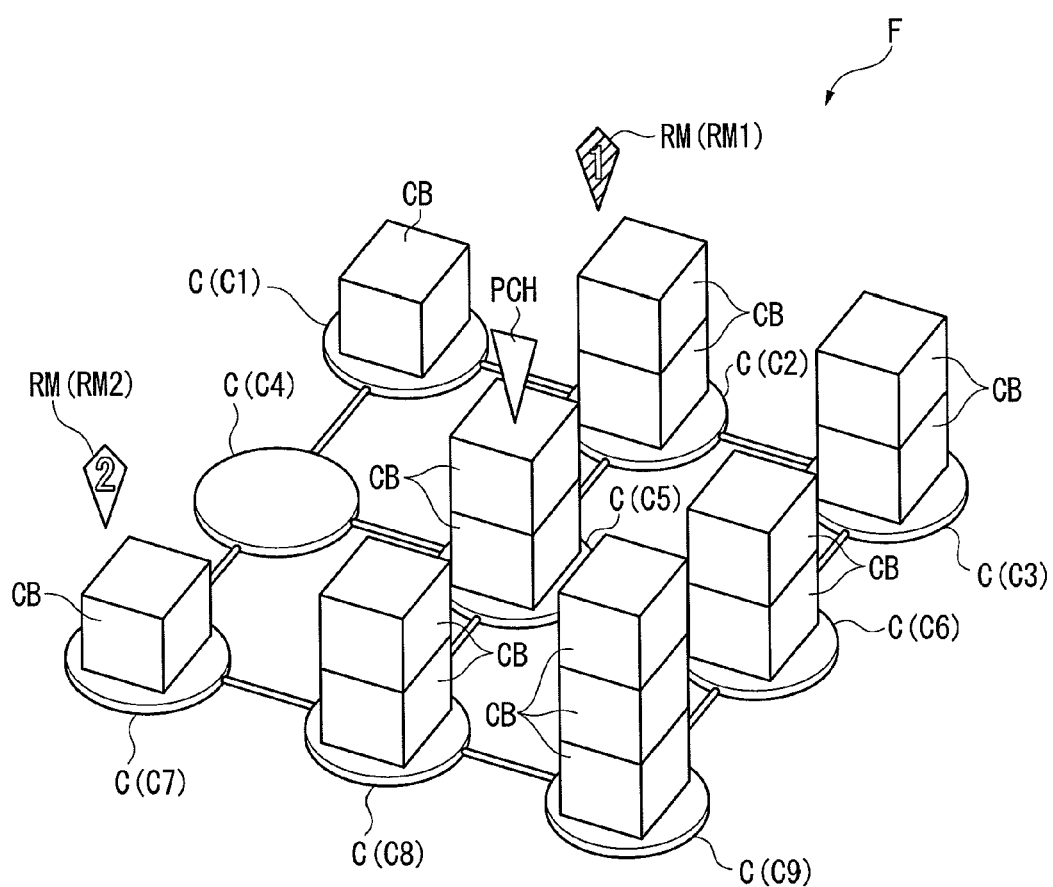
FIG. 11 is a diagram showing an example of the game screen in a reservation mode in the first embodiment.

FIG. 11 is a diagram showing an example of the game screen GS in a reservation mode.

The above-described game is in a normal mode in which when the key 321 is pressed after the key 37L or the key 37R is pressed, a negative or positive acting force is exerted immediately to increase or decrease cubes CB on cells C to which annular objects are set. On the other hand, in the reservation mode, acting forces are not exerted but are reserved when the key 321 is pressed, and the acting forces are exerted collectively when the key 323 (see FIG. 2) is pressed.

Specifically, in the reservation mode, as shown in FIG. 11, when the key 321 is pressed after the key 37L or the key 37R is pressed as required, a reservation marker RM (RM1) indicating that the exertion of an acting force is reserved appears in the vicinity of the active cell C. Further, when the key 321 is pressed after the key 37L or the key 37R is pressed as required, a similar reservation marker RM (RM2) appears in the vicinity of the active cell C.

Numbers displayed within the reservation markers RM indicate order of reservation. In addition, a reservation marker RM indicating that the exertion of a negative acting force is reserved and a reservation marker RM indicating that the exertion of a positive acting force is reserved are colored in respective different colors.

Thus, in the example of FIG. 11, the first reservation marker RM1 indicating that the exertion of a negative acting force is reserved is set at the cell C2, and the second reservation marker RM2 indicating that the exertion of a positive acting force is reserved is set at the cell C7.

Then, as described above, when the key 323 is pressed, the reserved acting forces are exerted at once to increase or decrease cubes CB.

[Configuration of Device Main Unit]

Figure 12:
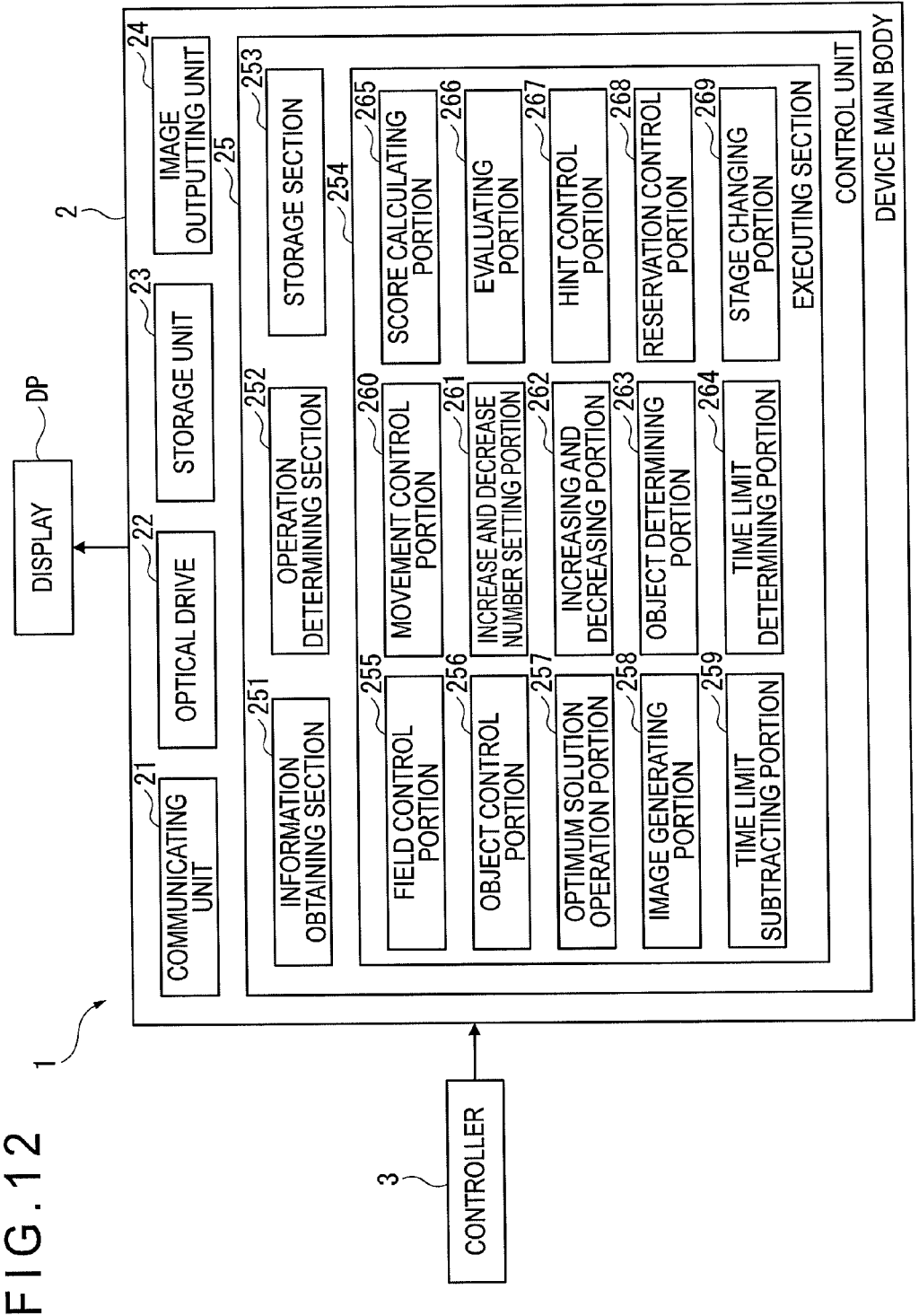
FIG. 12 is a block diagram showing the configuration and functions of a device main body in the first embodiment.

FIG. 12 is a block diagram showing the configuration and functions of the device main body 2.

The device main body 2 reads and processes the game program, and executes the above-described game. As shown in FIG. 12, the device main body 2 includes a communicating unit 21, an optical drive 22, a storage unit 23, an image outputting unit 24, and a control unit 25.

The communicating unit 21 establishes communication connection to a server on a network such as the Internet and the like (not shown).

The optical drive 22 reads information from a disk type recording medium such as a CD (Compact Disc), a DVD (Digital Versatile Disc), a Blu-ray (registered trademark) Disc, or the like. This information includes the game program for executing the above-described game.

The storage unit 23 is formed by a semiconductor memory, an HDD (Hard Disk Drive), and the like. This storage unit 23 is configured to be able to store the game program for executing the above-described game.

The image outputting unit 24 outputs image data generated by the control unit 25 (including the image data of the game screen GS) to the above-described display DP.

[Configuration of Control Unit]

The control unit 25 controls the operation of the device main body 2 in accordance with various kinds of programs stored by the storage unit 23, according to an operating signal received from the above-described controller 3 or autonomously. A CPU (Central Processing Unit) for processing the programs, a RAM (Random Access Memory), a ROM (Read Only Memory), a chip set, and the like are implemented as the control unit 25. These parts are configured as a circuit board connected via a bus. That is, the control unit 25 exerts various functions while the hardware resources of the CPU and the like and the software resources of the various kinds of programs including the game program cooperate with each other. Thus, the functions realized by the control unit 25 may be realized by hardware (including hardware whose operation is controlled by firmware) or may be realized by the hardware and software.

Incidentally, the above-mentioned bus is connected with the communicating unit 21, the optical drive 22, the storage unit 23, and the image outputting unit 24 described above. Information is transmitted and received between the communicating unit 21, the optical drive 22, the storage unit 23, and the image outputting unit 24 and the CPU via the chip set.

This control unit 25 for example controls not only the operation of the communicating unit 21 and the optical drive 22 but also the reading and recording of information by the storage unit 23. The control unit 25 also makes generated image data output to the display DP by the image outputting unit 24.

Such a control unit 25 includes an information obtaining section 251 realized by the above-described chip set, an operation determining section 252 and an executing section 254 realized by the CPU, and a storage section 253 formed by the RAM and the ROM described above.

The information obtaining section 251 not only obtains an operating signal from the controller 3 but also obtains information such as the game program and the like from the server on the network via the communicating unit 21. The information obtaining section 251 also obtains the information from the optical drive 22 and the storage unit 23. The information obtaining section 251 then transmits the obtained information to the CPU. Incidentally, the game program thus obtained by the information obtaining section 251 includes an image generating program and an information processing program according to an embodiment of the present technology.

The operation determining section 252 determines the obtained operating signal.

The storage section 253 temporarily stores the obtained information. In addition, the storage section 253 functions as a work memory for the executing section 254.

[Configuration of Executing Section]

The executing section 254 is realized as one function of the CPU, as described above. Specifically, the CPU constitutes the executing section 254 and executes the above-described game when the CPU processes the obtained game program in a case where the operation determining section 252 determines that an operating signal to execute the game is received from the controller 3.

The executing section 254 has the respective functions of a field control portion 255, an object control portion 256, an optimum solution operation portion 257, an image generating portion 258, a time limit subtracting portion 259, a movement control portion 260, an increase and decrease number setting portion 261, an increasing and decreasing portion 262, an object determining portion 263, a time limit determining portion 264, a score calculating portion 265, an evaluating portion 266, a hint control portion 267, a reservation control portion 268, and a stage changing portion 269.

The field control portion 255 generates the field F formed by the cells C1 to C9 described above within a virtual space. At this time, when cells PC appeared in an immediately preceding stage, the field control portion 255 forms the field F in which the cells PC are connected to the cells C1 to C9 via lines L on the basis of the above-described evaluation in the immediately preceding stage.

In addition, when the time limit determining portion 264 to be described later determines that an elapsed time has reached a predetermined time, the field control portion 255 makes cells PC (PC1 to PC4) sequentially appear on the field F as described above.

Further, when the operation determining section 252 determines that an operating signal corresponding to an operation of inverting the field F (operation of pressing the key 324) is received, the field control portion 255 inverts the field F as described above.

The object control portion 256 corresponds to an object setting portion according to an embodiment of the present technology. The object control portion 256 sets the arrangement position and the number of cubes CB arranged on the field F according to the state of the game in progress. For example, at a time of a start of each stage, the object control portion 256 sets the arrangement position and the number of cubes CB according to a predetermined algorithm, and allocates the plurality of cubes CB to the cells C1 to C9. The object control portion 256 thereby generates the problem of a stage in question. For example, the object control portion 256 combines the arrangement and the number of cubes in question with each other on the basis of the arrangement and the number of cubes CB to be erased by negative and positive acting forces at the above-described first to third levels (second and third levels in particular), and allocates the combined arrangement and number of cubes CB to the cells C. The object control portion 256 thereby generates the problem of each stage. Specifically, the object control portion 256 sets the arrangement and the number of cubes CB arranged on the cells C1 to C9 by selecting at least one cell C from the cells C1 to C9 and combining negative and positive acting forces at the first to third levels with each other with the selected cell C as a center.

At this time, when the field F includes cells PC, the cells PC become objects on which to dispose cubes CB in addition to the cells C1 to C9. Thus, the cells PC also become objects for selection by the object control portion 256, and cubes CB are set also on the cells PC. Further, when the cubes CB are increased or decreased by exerting the above-described negative and positive acting forces during the game, the object control portion 256 increases or decreases the cubes CB on the field F on the basis of a result of increase or decrease by the increasing and decreasing portion 262 to be described later.

The optimum solution operation portion 257 obtains at least one sample of the above-described solution (a minimum operation procedure and a minimum number of operations on the cubes CB) by operation. At this time, the optimum solution operation portion 257 sets a first move in the minimum operation procedure to one of cells C selected from the cells C1 to C9 when the above-described object control portion 256 generates the problem of the stage. This facilitates the operation for the solution.

The image generating portion 258 generates the image data of the game screen GS according to the state of the game in progress. That is, the image generating portion 258 generates the image data of the game screen GS including the above-described field F (including the cubes CB, the character PCH, annular objects (including annular objects T), markers M, reservation markers RM, and the like) generated within the virtual space and the regions A1 to A7.

At this time, the image generating portion 258 generates the image data of the game screen GS where the cubes CB are arranged on the respective cells C and PC according to the numbers and arrangements of the cubes CB as increase or decrease objects set on the respective cells C and PC by the object control portion 256. The image generating portion 258 also generates image data obtained by changing the position of the character PCH on the game screen GS on the basis of control of the movement control portion 260 to be described later. In addition, the image generating portion 258 generates the image data of the game screen GS for a viewpoint according to an input operation on the analog operating parts 35 and 36. This image data is output to the display DP via the image outputting unit 24 as described above.

The time limit subtracting portion 259 starts subtraction from a time limit set in advance simultaneously with a start of each stage. In other words, the time limit subtracting portion 259 clocks a time from a start of a stage.

When the operation determining section 252 determines that an operating signal corresponding to an operation of moving the character PCH (operation of pressing a direction key 31) is received, the movement control portion 260 moves the character PCH on the field F on the basis of the operation. At this time, as described above, the character PCH can move to a cell C or PC on the field F only along a line L.

When the operation determining section 252 determines that an operating signal corresponding to an operation of setting an annular object (including an annular object T) for exerting a negative or positive acting force (which operation is an operation of pressing the key 37L or the key 37R), that is, an operation of setting an increase or decrease number for the cubes CB as increase or decrease objects is received, the increase and decrease number setting portion 261 sets the increase or decrease number for the increase or decrease objects with the active cell C (including a cell PC) as a center according to the number of times of the setting operation. On the basis of the increase or decrease number set by the increase and decrease number setting portion 261, the above-described field control portion 255 makes the annular object appear on the field F, and the image generating portion 258 generates the image data of the game screen GS in this state. Incidentally, as described above, after the acting force corresponding to the annular object is exerted, the set annular object disappears from the game screen GS.

When the operation determining section 252 determines that an operating signal corresponding to an operation of exerting the acting force indicated by the set annular object (which operation is an operation of pressing the key 321), that is, an operation of increasing or decreasing the increase or decrease objects according to the set increase or decrease number is received, the increasing and decreasing portion 262 adds together the number of cubes CB set on each cell C (including cells PC) and the set increase or decrease number (the classification (negative or positive acting force) and the number of annular objects), and increases or decreases the cubes CB on the field F, as described above. A result of this increase or decrease is referred to by the object control portion 256. The object control portion 256 resets the arrangement and the number of cubes CB to a state corresponding to the result of the increase or decrease. The image generating portion 258 generates the image data of the game screen GS including the reset cubes CB.

Incidentally, in a case where the number of times shown in the third region A3 is "0" when an acting force at the above-described first level is to be exerted, the increasing and decreasing portion 262 does not increase or decrease the cubes CB. On the other hand, in a case where an acting force at the first level is exerted when the number of times is not "0," the increasing and decreasing portion 262 subtracts "1" from the number of times.

The object determining portion 263 determines whether all the cubes CB on the field F are erased. When the object determining portion 263 determines that all the cubes CB are erased, the executing section 254 determines that the stage in question is cleared.

The time limit determining portion 264 determines whether the elapsed time subtracted by the time limit subtracting portion 259 has become a predetermined time set in advance for each degree of difficulty in each stage. The time limit determining portion 264 also determines whether the remaining time has become "0." When the time limit determining portion 264 determines that the remaining time has become "0," it is determined that the game is over, and the executing section 254 ends the game.

The score calculating portion 265 and the evaluating portion 266 calculate a score in the stage in question and make evaluation on the basis of the remaining time and a manner of erasing the cubes CB (for example the number of times of pressing of the key 321) when the stage is cleared. This score is added to a total score displayed in the fourth region A4, and the evaluation of the stage is displayed before the game screen GS of the stage disappears.

The hint control portion 267 determines whether the number of times displayed in the second region A2 is "0" when the operation determining section 252 determines that an operating signal corresponding to an operation of requesting a hint (which operation is an operation of pressing the selecting key 33) is received.

When determining that the number of times in question is not "0," the hint control portion 267 makes a marker M as described above appear in the vicinity of a cell C for a first move in one solution calculated by the optimum solution operation portion 257, and subtracts one from the number of times in question. Incidentally, when it is determined that the operating signal is received again in the same stage, the hint control portion 267 makes the marker M appear without subtracting from the number of times in question. The image data of the game screen GS including the marker M is generated by the above-described image generating portion 258.

When the number of times in question is "0," on the other hand, the hint control portion 267 does not display the marker M nor subtract from the number of times in question.

The reservation control portion 268 functions in the reservation mode described above. When the operation determining section 252 determines that an operating signal corresponding to an operation of reserving the exertion of a negative or positive acting force (which operation is an operation of pressing the key 321) is received, the reservation control portion 268 makes the storage section 253 store the acting force corresponding to the arrangement and number of set annular objects (annular objects T), and reserves the acting force. Together with this, the reservation control portion 268 makes a reservation marker RM as described above appear in the vicinity of the active cell C at the time of the operation being performed. The image data of the game screen GS including the reservation marker RM is generated by the above-described image generating portion 258.

Then, when the operation determining section 252 determines that an operating signal corresponding to an operation of exerting the reserved acting force (which operation is an operation of pressing the key 323) is received, the reservation control portion 268 makes the increasing and decreasing portion 262 increase or decrease the cubes CB according to the reserved acting force.

The stage changing portion 269 corresponds to a stage ending portion according to an embodiment of the present technology. When the object determining portion 263 determines that all the cubes CB on the field F are erased, the stage changing portion 269 determines that the stage is cleared, and ends the stage. Then, the stage changing portion 269 makes the field control portion 255, the object control portion 256, the optimum solution operation portion 257, and the image generating portion 258 described above perform a process for starting a next stage.

[Process of Control Unit]

Figure 13:
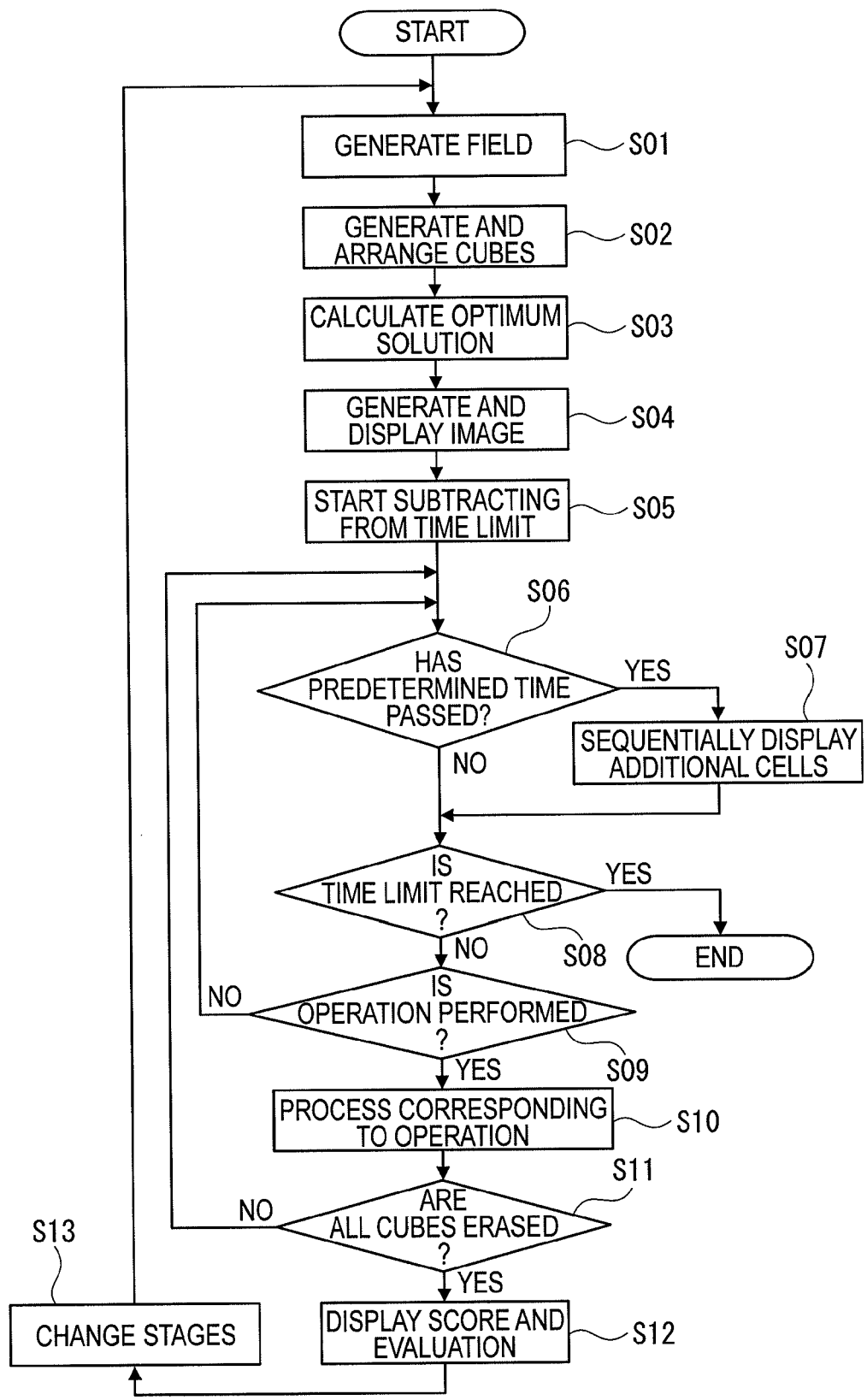
FIG. 13 is a flowchart of a general process of a control unit in the first embodiment.

FIG. 13 is a flowchart of a general process of the control unit 25 when executing the above-described game.

When the control unit 25 executes the above-described game, the above-described CPU executes the game program obtained from the units 21 to 23, and thereby the functions of the executing section 254 are realized. When the game is executed, as shown in FIG. 13, the field control portion 255 first generates the above-described field F including the cells C in a virtual space as a process before a start of the game (step S01).

Next, as described above, the object control portion 256 generates the problem of a stage, and arranges cubes CB on the cells C on the basis of the problem (step S02).

The optimum solution operation portion 257 then obtains a solution for erasing the plurality of cubes CB by operation (step S03).

The image generating portion 258 thereafter generates an image, and the image is displayed by the display DP (step S04). The process before a start of the game is thereby ended.

After the time limit subtracting portion 259 starts subtracting from the time limit, and the game is started (step S05), the time limit determining portion 264 monitors a remaining time, and determines whether the elapsed time from the start of the game has become the above-described predetermined time (step S06).

When the time limit determining portion 264 determines that the elapsed time from the start of the game has not become the predetermined time, the executing section 254 makes the process proceed to step S08.

When the time limit determining portion 264 determines that the elapsed time from the start of the game has become the predetermined time, on the other hand, the field control portion 255 adds a cell PC1 as described above to the field F (step S07), and the executing section 254 makes the process proceed to step S08. Incidentally, the field control portion 255 sequentially adds cells PC2 to PC4 with each of further lapses of time from the addition of the cell PC1. The image data of the game screen GS showing the state of the field F to which the cells PC are added is generated by the image generating portion 258.

In step S08, the time limit determining portion 264 determines whether the remaining time has become "0," that is, whether the elapsed time has reached the time limit (step S08).

When the time limit determining portion 264 determines that the elapsed time has not reached the time limit, the operation determining section 252 determines whether an operating signal corresponding to an input operation is input from the controller 3, that is, whether the input operation is performed (step S09).

When the operation determining section 252 determines in the determination process of step S09 that no input operation is performed, the executing section 254 returns the process to step S06.

When the operation determining section 252 determines in the determination process of step S09 that an input operation is performed, on the other hand, the executing section 254 performs a process according to the input operation (step S10).

For example, when a direction key 31 is pressed, the movement control portion 260 moves the character PCH to a position corresponding to the input operation. When the key 37L or the key 37R is pressed, the increase and decrease number setting portion 261 makes annular objects (including annular objects T) corresponding to the number of times of pressing of the key 37L or the key 37R appear within the above-described area with the active cell C as a center. Further, when the key 321 is pressed, the increasing and decreasing portion 262 increases or decreases the cubes CB on the field F on the basis of the classification, position, and number of such annular objects in the normal mode, and the exertion of an acting force is reserved in the reservation mode.

In addition, when the key 322 is pressed, the executing section 254 cancels an acting force exerted immediately before in the normal mode, and cancels an acting force reserved immediately before in the reservation mode.

Further, when the key 323 is pressed, in the reservation mode, the reserved acting force is exerted, and the increasing and decreasing portion 262 increases or decreases the cubes CB on the field F on the basis of the classification, position, and number of annular objects.

In addition, when the key 324 is pressed, the field control portion 255 inverts the field F. When the selecting key 33 is pressed, the hint control portion 267 makes a marker M as described above appear. Besides, when the analog operating parts 35 and 36 are operated, the image generating portion 258 changes the viewpoint of the field F.

The image data of the game screen GS showing the state of such a field F is generated by the image generating portion 258, and the game screen GS is displayed on the display DP.

After such step S10, the object determining portion 263 determines whether all the cubes CB on the field F are erased (step S11).

When the object determining portion 263 determines that there is a cube CB that has not been erased, the executing section 254 returns the process to step S06. This allows a further input operation.

When the object determining portion 263 determines that all the cubes CB are erased, on the other hand, it is determined that the stage is cleared, and the calculation of a score by the score calculating portion 265 and the evaluation of the clearing of the stage by the evaluating portion 266 are performed (step S12). The score and the evaluation are displayed on the game screen GS by the image generating portion 258.

Thereafter, the stage changing portion 269 makes the functional portions of the executing section 254 perform a process for starting a next stage (process for changing stages) (step S13), and returns the process to step S01. At this time, when a cell PC as described above appears in the immediately preceding stage and a low grade is given in the immediately preceding stage, the field control portion 255 generates the field F including the cell PC.

Incidentally, when the time limit determining portion 264 determines in the determination process of step S08 that the time limit is reached, the executing section 254 ends the game, and switches to an initial screen.

Effect of Embodiment

The information processing device 1 according to the present embodiment described above has the following effects.

The information processing device 1 executes the game in which the number of cubes CB set on the plurality of cells C forming the field F are increased or decreased on the basis of the number of annular objects (including annular objects T) set with a cell C selected by the user (active cell C at which the character PCH is positioned) as a center, and the stage is cleared when the number of cubes CB set on each of the cells C becomes "0."

According to this, a different number of cubes CB are set on each cell C in each stage, whereby stages of different set contents can be enjoyed and a sense of achievement can be imparted to the user because an advance to a next stage can be made by clearing a stage. In addition, because an advance is made to a stage of such different settings, the same operations are not performed in each stage, so that the user does not readily become bored. Thus, a highly entertaining game can be configured.

When an input operation of requesting a hint is performed, the position of an active cell C for a first move in one solution to a problem is indicated by a marker M. According to this, even when a degree of difficulty is increased as advances are made to more advanced stages, the position of the marker M serves as a hint so that it can be made easier to clear the stage in question. It is thus possible to prevent interest in the game from being dampened because an advance to a next stage cannot be made.

When it takes a predetermined time to clear one stage, the field F including cells PC (PC1 to PC4) in addition to the cells C1 to C9 is generated and the number of cells on which cubes CB are disposed is increased in a stage next to the stage in question. Thus, in the next stage, the degree of difficulty of the game is increased as compared with the immediately preceding stage. According to this, a wide variety of stages can be configured, so that occurrence of the boredom of the user can be further reduced. In addition, the user tries to clear a stage without the number of cells being increased, so that a sense of being pressed can be imparted to the user. Therefore, interest in the game can be further increased.

When an operation of inverting the field F is performed, the whole of the field F is inverted together with the cubes CB arranged on each cell C (including cells PC). According to this, the cubes CB situated on the reverse side of the cells C can be positioned on the obverse side, thus making it easy to grasp the number of cubes CB set on the cells C. Thus, the operability of the game can be improved.

Second Embodiment

A second embodiment of the present technology will next be described.

An information processing device according to the present embodiment has similar functions and configuration to those of the information processing device 1 described above, and performs similar processing to that of the information processing device 1. However, a difference lies in the configuration of the field of the game when the above-described game program (including the image generating program and the information processing program) is executed.

The following description will be made of the field of the game executed by processing the game program in the information processing device according to the present embodiment. Incidentally, parts identical or substantially identical to the parts already described are identified by the same reference symbols, and description thereof will be omitted.

FIGS. 14 to 17 are diagrams showing the field F in the game executed in the information processing device according to the present embodiment.

Figure 14:
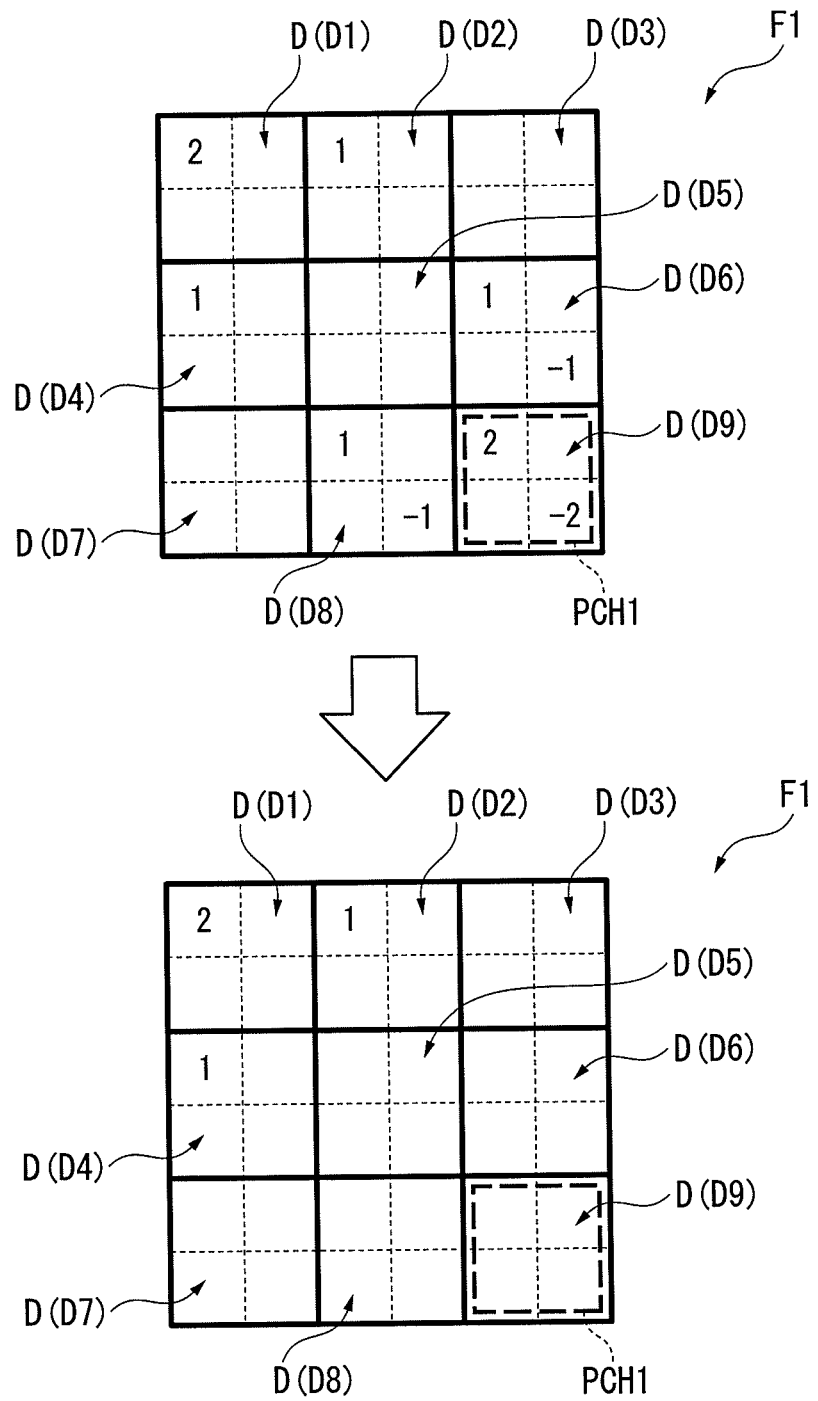
FIG. 14 is a diagram showing a field in a game according to a second embodiment of the present technology.

The field F1 displayed within a game screen in the present embodiment is formed by disposing cells D (D1 to D9), which are a plurality of regions divided from each other and adjacent to each other, at positions corresponding to the vertices of a lattice, as shown in an upper part of FIG. 14. A player character PCH1 indicated by a square of a dotted line is disposed on the field F1. The character PCH1 indicates an active cell D. The character PCH1 moves on the cells D according to operations of pressing direction keys 31 as described above.

A numerical value indicating the number of cubes CB as increase or decrease objects as described above is set in an upper left section of each of these cells D. A positive numerical value shown in the upper left section indicates that cubes CB are disposed on the obverse side of the cell D. A negative numerical value shown in the upper left section indicates that cubes CB are disposed on the reverse side of the cell D.

The strength (corresponding to the number of annular objects) of an acting force according to user input operation (operation of pressing a key 37L or a key 37R) is set in a lower right section of each of the cells D. When a numerical value (corresponding to an increase or decrease number according to an embodiment of the present technology) in the lower right section is a positive numerical value, the positive numerical value indicates that a positive acting force is set. A negative numerical value in the lower right section indicates that a negative acting force is set.

For example, in the field F1 shown in the upper part of FIG. 14, "2" set in the upper left sections of the cells D1 and D9 indicates that two cubes CB are disposed on the obverse side of the cells D1 and D9. Similarly, "1" set in the upper left sections of the cells D2, D4, D6, and D8 indicates that one cube CB is disposed on the obverse side of the cells D2, D4, D6, and D8.

In addition, "−2" set in the lower right section of the cell D9 indicates that a negative acting force corresponding to two annular objects T is set at the cell D9 by the operation of pressing the key 37L. Similarly, "−1" set in the lower right sections of the cells D6 and D8 indicates that a negative acting force corresponding to one annular object T is set at the cells D6 and D8 by the operation of pressing the key 37L.

When a key 321 is pressed in the normal mode to exert the set acting forces, an increasing and decreasing portion 262 adds together the numbers in the upper left sections and the numbers in the lower right sections. Thus, when the key 321 is pressed in the state shown in the upper part of FIG. 14, the upper left sections of the cells D6, D8, and D9 become blank sections indicating that no cubes CB are present, and the lower right sections of the cells D6, D8, and D9 similarly become blank sections indicating that no acting force is set, as shown in a lower part of FIG. 14.

Figure 15:
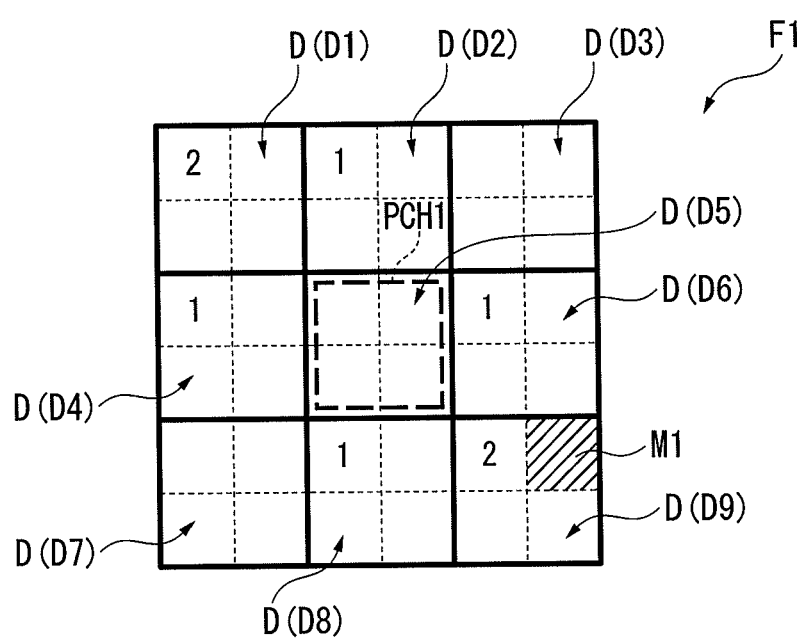
FIG. 15 is a diagram showing the field in the second embodiment.

In the present embodiment, when an operation of requesting a hint (operation of pressing a selecting key 33) is performed, as shown in FIG. 15, a marker M1 is displayed in an upper right section of a cell D for a first move in one solution as described above. Incidentally, though not shown in the figure, a reservation marker is displayed in a lower left section of a cell D.

Figure 16:
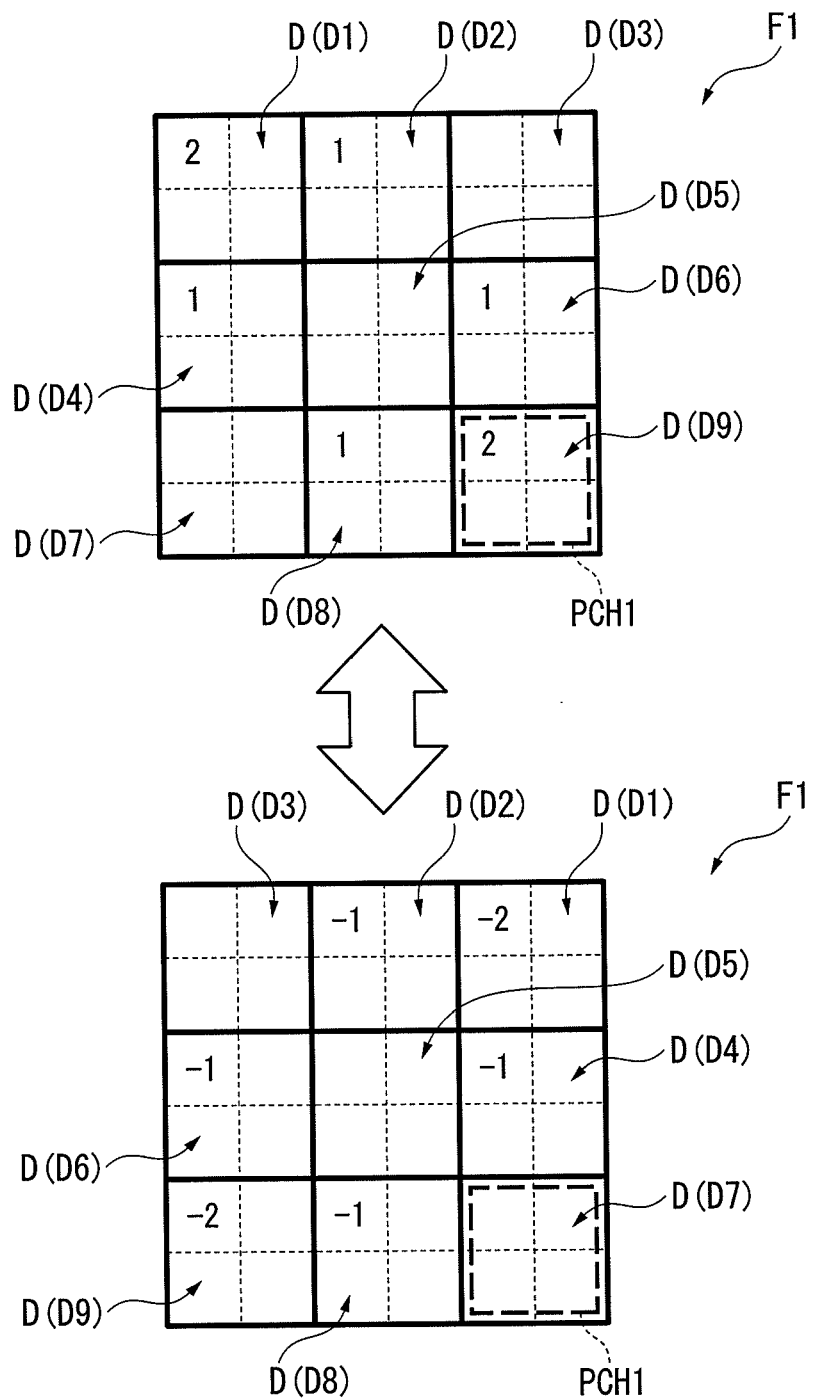
FIG. 16 is a diagram showing the field in the second embodiment.

In addition, in the present embodiment, when an operation of inverting the field F1 (operation of pressing a key 324) is performed, as shown in an upper part and a lower part of FIG. 16, the field F1 is inverted. As in the above-described case, as a result of this inversion, the cubes CB that were disposed on the obverse side of the respective cells D are disposed on the reverse side, and the cubes CB that were disposed on the reverse side of the respective cells D are disposed on the obverse side. Thus, the positive and negative signs of the numerical values set in the upper left sections of the cells D become opposite signs as the field F1 is inverted. Incidentally, at this time, when acting forces are set in cells D, the positive and negative signs of the numerical values in the lower right sections also become opposite signs.

Figure 17:
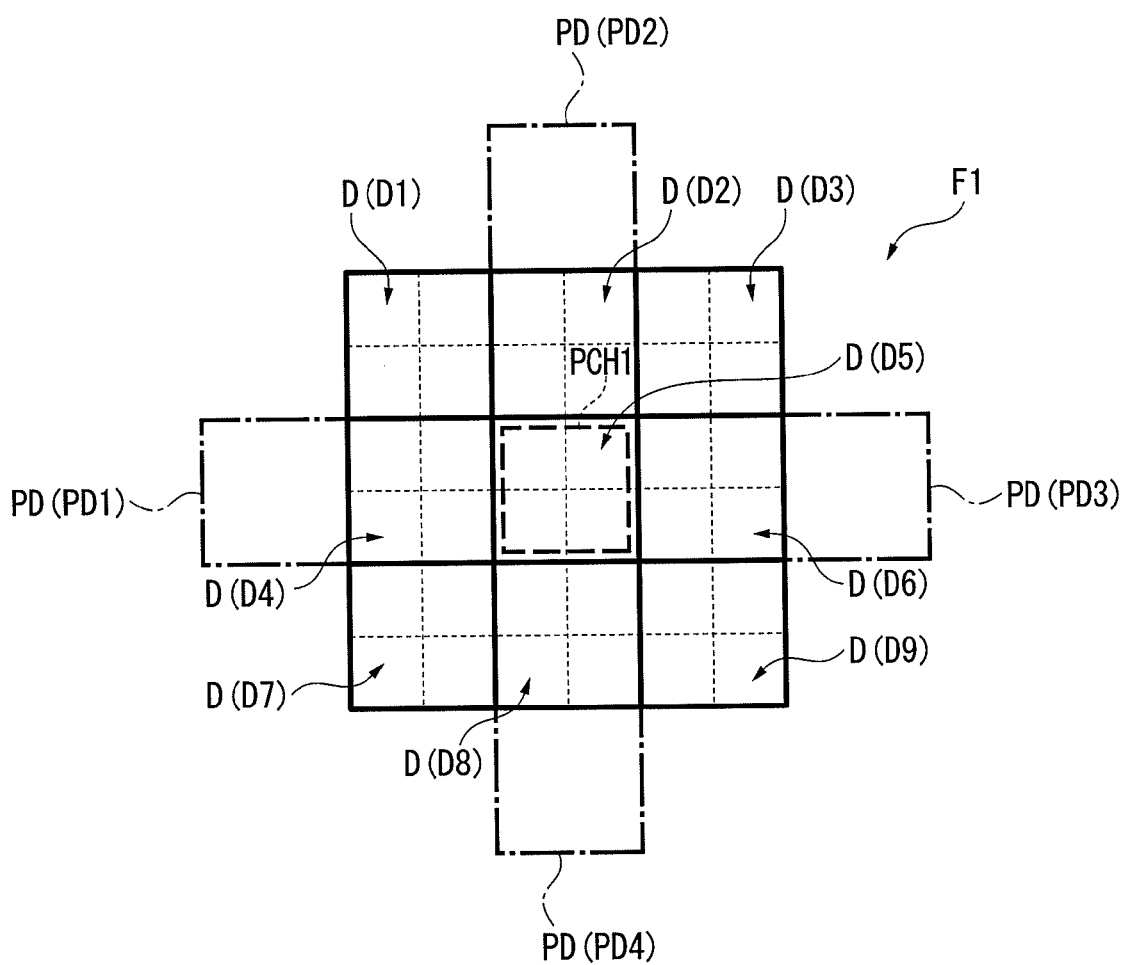
FIG. 17 is a diagram showing the field in the second embodiment.

Further, in the present embodiment, as shown in FIG. 17, the appearance positions of cells PD (PD1 to PD4) corresponding to the above-described cells PC (PC1 to PC4) and each appearing according to an elapsed time from a start of a stage are each set on the outside of the cells D2, D4, D6, and D8.

The image data of a game screen including such a field F1 is generated by an image generating portion 258. The image data is output to a display DP by an image outputting unit 24, so that the game screen is displayed by the display DP.

The information processing device according to the present embodiment can produce similar effects to those of the above-described information processing device 1.

Modifications of Embodiments

The present technology is not limited to the foregoing embodiments, and modifications, improvements, and the like within a scope of the present technology are included in the present technology. For example, the present technology does not need to have all the functions and configurations shown in the foregoing embodiments, but different functions and configurations may be further added to the present technology.

In each of the foregoing embodiments, the information processing device 1 functioning also as an image generating device and a game device includes the device main body 2 and the controller 3, and the device main body 2 is connected with the display DP for displaying a screen at a time of execution of a program (including the game screen GS). However, the present technology is not limited to this. That is, the information processing device for processing an image generating program and an information processing program according to embodiments of the present technology may be a device in any form, and may be for example a portable type terminal device in which a device main body, a controller, and a display are configured integrally with each other. In addition, the shape and key arrangement of the controller are not limited to the configuration of the controller 3. The controller may have another shape and another key arrangement, and the number of such keys can be set appropriately.

The field F including cells C and PC as regions and cubes CB as increase or decrease objects disposed on the cells C and PC is displayed by three-dimensional graphics in the foregoing first embodiment, and the field F1 composed of a plurality of cells D and PD to which the number of increase or decrease objects and the like are set is displayed by two-dimensional graphics in the foregoing second embodiment. However, the present technology is not limited to this. That is, the configuration of the game screen may be any configuration as long as game operations and processes as described above can be performed.

In each of the foregoing embodiments, the cells C and D are arranged at positions corresponding to the vertices of a lattice, and the number of such cells C or D is nine. However, the present technology is not limited to this. That is, the number and arrangement of cells forming a field can be set appropriately. For example, the field does not need to have the configuration in which a plurality of cells are arranged at respective positions corresponding to the vertices of a lattice, but may have a configuration in which a plurality of cells are connected to each other directly or indirectly or a configuration in which a plurality of cells are not connected to each other. Similarly, the number, the arrangement position, and the order of arrangement of cells PC and PD can be set appropriately.

In addition, the shape and the like of cells as regions can be set appropriately. Further, the shape and the like of the player character, objects (cubes) as increase or decrease objects, markers, reservation markers, and the like can be set appropriately.

In each of the foregoing embodiments, the range in which negative and positive acting forces are exerted is set by one to three times of operation of pressing the key 37L or the key 37R. However, the present technology is not limited to this. That is, the range may be set according to not only one to three times but also four times or more of pressing operation. In this case, it suffices to enlarge the range in which the acting forces are exerted according to the number of times of pressing of a predetermined key.

When the problem of each stage is generated, the object control portion 256 sets cubes CB (increase or decrease objects) to be allocated to respective cells C (respective regions) by a predetermined algorithm in the foregoing first embodiment, and sets numerical values indicating the numbers of increase or decrease objects to be allocated to respective cells D (respective regions) by a predetermined algorithm in the foregoing second embodiment. However, the present technology is not limited to this. That is, a problem may be generated with the number and arrangement of increase or decrease objects determined in advance in each stage. In addition, a condition for clearing each stage is not limited to a condition that the number of increase or decrease objects in each region become "0." The number may be another number, and may be different for different regions.

In each of the foregoing embodiments, the object control portion 256 generates the problem of each stage, and the optimum solution operation portion 257 calculates a solution to the problem (including solutions considered to be close to an optimum solution). However, the present technology is not limited to this. That is, when the object control portion 256 generates the problem, the solution may be determined first, and the problem may be generated by performing inverse operation from the solution. In this case, the solution does not need to be calculated from the problem, and therefore the executing section 254 can perform processes efficiently.

In each of the foregoing embodiments, a case in which the game program (including an image generating program and an information processing program) processed by the information processing device 1 is obtained via a network, a case where the game program is obtained from a disk type recording medium, and a case where the game program is obtained from a semiconductor memory and an HDD have been illustrated. However, the present technology is not limited to this. That is, the program may be recorded in another format, and it suffices for the program to be readable by a computer.

The invention claimed is:

1. An image generating program executed by an image generating device having a processor, the image generating program making the image generating device perform:
    setting, using the processor a number of increase or decrease objects in at least one of a plurality of regions on a field, the field having the plurality of regions divided from each other and connected to each other, in each stage;
    generating a display image including a display corresponding to the field and the set number of increase or decrease objects;
    generating the display image in which an increase or decrease number corresponding to a selected level is set in the region within a predetermined area with a selected region selected from the plurality of regions as a center;
    generating the display image in which the number of increase or decrease objects set in each of the regions is increased or decreased on a basis of the set increase or decrease number; and
    ending the stage when the number of increase or decrease objects set in each of the regions becomes a predetermined value as a result of the number of increase or decrease objects set in each of the regions being increased or decreased,
    wherein the predetermined value is zero.

2. The image generating program according to claim 1, wherein the image generating device is made to display a position of the selected region in which the increase or decrease number is set for a first move in an operation procedure for bringing the set number of increase or decrease objects in each region to the predetermined value when a first input operation is performed.

3. The image generating program according to claim 1, wherein the image generating device is made to perform:
    clocking an elapsed time from a time of a start of the stage;
    determining whether the elapsed time has reached a predetermined time; and
    generating another region in a vicinity of the plurality of regions in the display image when it is determined that the elapsed time has reached the predetermined time, the field having the other region in addition to the plurality of regions is generated at a time of a start of a stage next to the stage in which the other region is generated.

4. The image generating program according to claim 1, wherein the image generating device is made to invert the field and make a positive or negative sign of the number of increase or decrease objects in each of the regions an opposite sign when a second input operation is performed.

5. A non-transitory computer readable recording medium on which the image generating program according to claim 1 is recorded so as to be readable by a computer.

6. An information processing method performed using an information processing device having a processor, the information processing method comprising:
    setting, using the processor, a number of increase or decrease objects in at least one of a plurality of regions on a field, the field having the plurality of regions divided from each other and connected to each other, in each stage;
    setting an increase or decrease number corresponding to a selected level in the region within a predetermined area with a selected region selected from the plurality of regions as a center;
    increasing or decreasing the number of increase or decrease objects set in each of the regions on a basis of the set increase or decrease number; and
    ending the stage when the number of increase or decrease objects set in each of the regions becomes a predetermined value as a result of the number of increase or decrease objects set in each of the regions being increased or decreased,
    wherein the predetermined value is zero.

7. An information processing device having a processor comprising:
    an object setting portion configured to, using the processor, set a number of increase or decrease objects in at least one of a plurality of regions on a field, the field having the plurality of regions divided from each other and connected to each other, in each stage;

an increase and decrease number setting portion configured to set an increase or decrease number corresponding to a selected level in the region within a predetermined area with a selected region selected from the plurality of regions as a center;

an increasing and decreasing portion configured to increase or decrease the number of increase or decrease objects set in each of the regions on a basis of the set increase or decrease number; and a stage ending portion configured to end the stage when the number of increase or decrease objects set in each of the regions becomes a predetermined value as a result of the number of increase or decrease objects set in each of the regions being increased or decreased by the increasing and decreasing portion, wherein the predetermined value is zero.

8. An information processing program executed by an information processing device, the information processing program making the information processing device function as:

an object setting portion configured to set a number of increase or decrease objects in at least one of a plurality of regions on a field, the field having the plurality of regions divided from each other and connected to each other, in each stage;

an increase and decrease number setting portion configured to set an increase or decrease number corresponding to a selected level in the region within a predetermined area with a selected region selected from the plurality of regions as a center;

an increasing and decreasing portion configured to increase or decrease the number of increase or decrease objects set in each of the regions on a basis of the set increase or decrease number; and a stage ending portion configured to end the stage when the number of increase or decrease objects set in each of the regions becomes a predetermined value as a result of the number of increase or decrease objects set in each of the regions being increased or decreased by the increasing and decreasing portion, wherein the predetermined value is zero.

* * * * *